(12) United States Patent
Yamazaki

(10) Patent No.: US 11,348,208 B2
(45) Date of Patent: May 31, 2022

(54) SIGNAL PROCESSING APPARATUS AND SIGNAL PROCESSING METHOD

(71) Applicant: SONY CORPORATION, Tokyo (JP)

(72) Inventor: Toshio Yamazaki, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/976,844

(22) PCT Filed: Feb. 22, 2019

(86) PCT No.: PCT/JP2019/006775
§ 371 (c)(1),
(2) Date: Aug. 31, 2020

(87) PCT Pub. No.: WO2019/171984
PCT Pub. Date: Sep. 12, 2019

(65) Prior Publication Data
US 2020/0410650 A1    Dec. 31, 2020

(30) Foreign Application Priority Data
Mar. 8, 2018    (JP) .............................. JP2018-041471

(51) Int. Cl.
*G06T 5/00* (2006.01)
*G06T 7/80* (2017.01)
*G06T 5/50* (2006.01)

(52) U.S. Cl.
CPC .............. *G06T 5/006* (2013.01); *G06T 5/50* (2013.01); *G06T 7/80* (2017.01)

(58) Field of Classification Search
CPC .. G06T 5/006; G06T 7/80; G06T 5/50; G03B 15/00; H04N 5/217; H04N 5/3572
See application file for complete search history.

(56) References Cited

U.S. PATENT DOCUMENTS

| 4,013,347 A * | 3/1977 | Nakamura ............. G02B 13/00 |
| | | 359/707 |
| 8,724,007 B2 * | 5/2014 | Chen ..................... H04N 5/247 |
| | | 348/345 |

(Continued)

FOREIGN PATENT DOCUMENTS

| CN | 104487803 A | 4/2015 |
| CN | 105027554 A | 11/2015 |

(Continued)

OTHER PUBLICATIONS

International Search Report and Written Opinion of PCT Application No. PCT/JP2019/006775, dated Apr. 23, 2019, 07 pages of ISRWO.

*Primary Examiner* — Charles T Shedrick
(74) *Attorney, Agent, or Firm* — Chip Law Group

(57) ABSTRACT

Provided is a signal processing apparatus that estimates image distortion in a case where images are captured through a transmissive body allowing light to pass through. The signal processing apparatus includes a lens distortion estimation section that estimates lens distortion based on a location of a feature point in a first image and a second image of an object. The first image is captured by an imaging section through a transmissive body and a lens that allow light to pass through. The second image is free of transmissive body distortion caused by the transmissive body and free of the lens distortion caused by the lens. The apparatus further includes a transmissive body distortion estimation section that estimates the transmissive body distortion based on the location of the feature point in the first image and a third image that is obtained by removing the estimated lens distortion from the first image.

12 Claims, 19 Drawing Sheets

(56) References Cited

U.S. PATENT DOCUMENTS

| | | |
|---|---|---|
| 2014/0248045 A1 | 9/2014 | Wada et al. |
| 2015/0172631 A1 | 6/2015 | Kasahara |
| 2018/0270417 A1* | 9/2018 | Suitoh ................... H04N 5/3572 |
| 2019/0095754 A1* | 3/2019 | Chen ................... G06K 9/00624 |
| 2020/0104977 A1* | 4/2020 | Su ........................... G06T 7/269 |

FOREIGN PATENT DOCUMENTS

| | | | |
|---|---|---|---|
| EP | 2902967 A1 * | 8/2015 | ............... G06T 7/85 |
| JP | 2009-302697 A | 12/2009 | |
| JP | 2014-199241 A | 10/2014 | |
| JP | 2015-169583 A | 9/2015 | |
| JP | 2017-062198 A | 3/2017 | |
| JP | 2018-028671 A | 2/2018 | |
| KR | 20160116075 A * | 10/2016 | ............... G06T 7/70 |
| KR | 20200049207 A * | 5/2020 | ............... G06T 5/006 |
| WO | WO-2014017409 A1 * | 1/2014 | ........... H04N 5/3572 |
| WO | WO-2016146105 A1 * | 9/2016 | ............... G06T 7/80 |
| WO | WO-2019171984 A1 * | 9/2019 | ............. G03B 15/00 |

* cited by examiner

SIGNAL PROCESSING APPARATUS AND SIGNAL PROCESSING METHOD

CROSS REFERENCE TO RELATED APPLICATIONS

This application is a U.S. National Phase of International Patent Application No. PCT/JP2019/006775 filed on Feb. 22, 2019, which claims priority benefit of Japanese Patent Application No. JP 2018-041471 filed in the Japan Patent Office on Mar. 8, 2018. Each of the above-referenced applications is hereby incorporated herein by reference in its entirety.

TECHNICAL FIELD

The present technology relates to a signal processing apparatus, a signal processing method, and a program, and more particularly to a signal processing apparatus, a signal processing method, and a program that are suitable for a case where images are captured through a transmissive body allowing light to pass through.

BACKGROUND ART

In the past, a technology for correcting lens distortion caused by a lens of a camera has been proposed (refer, for example, to PTL 1).

Further, in a case, for example, where a camera disposed in a compartment of a vehicle captures an image of a forward view from the vehicle through a windshield (front window), windshield distortion occurs in addition to the lens distortion.

Meanwhile, technologies for correcting lens distortion and windshield distortion have been proposed in the past. For example, a technology proposed in the past detects misalignment between a calibration chart image captured with a windshield installed and a calibration chart image captured with the windshield removed, and calibrates a camera in accordance with the detected misalignment (refer, for example, to PTL 2).

CITATION LIST

Patent Literature

[PTL 1]
 Japanese Patent Laid-open No. 2009-302697
[PTL 2]
 Japanese Patent Laid-open No. 2015-169583

SUMMARY

Technical Problems

However, the invention described in PTL 2 makes it necessary to capture the image of the calibration chart two times. This increases the time required for calibrating a camera. Further, the windshield is installed during a time interval between the first and second image captures. Therefore, if misalignment occurs between a camera main body and a lens, it is necessary to calibrate the camera all over again.

The present technology has been made in view of the above circumstances, and makes it possible to easily estimate image distortion occurring in a case where an image is captured through a windshield or other transmissive body allowing light to pass through, and remove the image distortion.

Solution to Problems

A signal processing apparatus according to an aspect of the present technology includes a lens distortion estimation section and a transmissive body distortion estimation section. The lens distortion estimation section estimates lens distortion based on a location of a feature point in a first image of a predetermined object and a location of a feature point in a second image of the object. The first image is captured by an imaging section through a transmissive body and a lens that allow light to pass through. The second image is free of transmissive body distortion caused by the transmissive body and free of the lens distortion caused by the lens. The transmissive body distortion estimation section estimates the transmissive body distortion based on the location of the feature point in the first image and the location of a feature point in a third image. The third image is obtained by removing the estimated lens distortion from the first image.

A signal processing method according to an aspect of the present technology is a method for a signal processing apparatus. The signal processing method includes estimating lens distortion based on a location of a feature point in a first image of a predetermined object and a location of a feature point in a second image of the object, and estimating transmissive body distortion based on the location of the feature point in the first image and a location of a feature point in a third image. The first image is captured by an imaging section through a transmissive body and a lens that allow light to pass through. The second image is free of the transmissive body distortion caused by the transmissive body and free of the lens distortion caused by the lens. The third image is obtained by removing the estimated lens distortion from the first image.

A program according to an aspect of the present technology causes a computer to perform a process including estimating lens distortion based on a location of a feature point in a first image of a predetermined object and a location of a feature point in a second image of the object, and estimating transmissive body distortion based on the location of the feature point in the first image and a location of a feature point in a third image. The first image is captured by an imaging section through a transmissive body and a lens that allow light to pass through. The second image is free of the transmissive body distortion caused by the transmissive body and free of the lens distortion caused by the lens. The third image is obtained by removing the estimated lens distortion from the first image.

An aspect of the present technology estimates lens distortion based on the location of a feature point in a first image of a predetermined object and the location of the feature point in a second image of the predetermined object, and estimates transmissive body distortion based on the location of the feature point in the first image and the location of the feature point in a third image. The first image is captured by an imaging section through a transmissive body and a lens that allow light to pass through. The second image is free of the transmissive body distortion caused by the transmissive body and free of the lens distortion caused by the lens. The third image is obtained by removing the estimated lens distortion from the first image.

Advantageous Effects of Invention

An aspect of the present technology makes it possible to easily estimate image distortion occurring in a case where an image is captured through a transmissive body that allows light to pass through.

It should be noted that the present technology is not necessarily limited to the above advantages. The present technology may provide any other advantages described in the present disclosure.

DESCRIPTION OF EMBODIMENTS

Embodiments of the present technology will now be described. The description will be given in the following order.

1. First embodiment (an example of making corrections with a distortion function)
2. Second embodiment (an example of making corrections with a distortion correction table)
3. Third embodiment (an example of estimating parameters of an imaging section)
4. Example applications
5. Example modifications
6. Other 1. First Embodiment A first embodiment of the present technology will now be described with reference to FIGS. 1 to 10.

<Example Configuration of Image Processing System 11>

Figure 1:
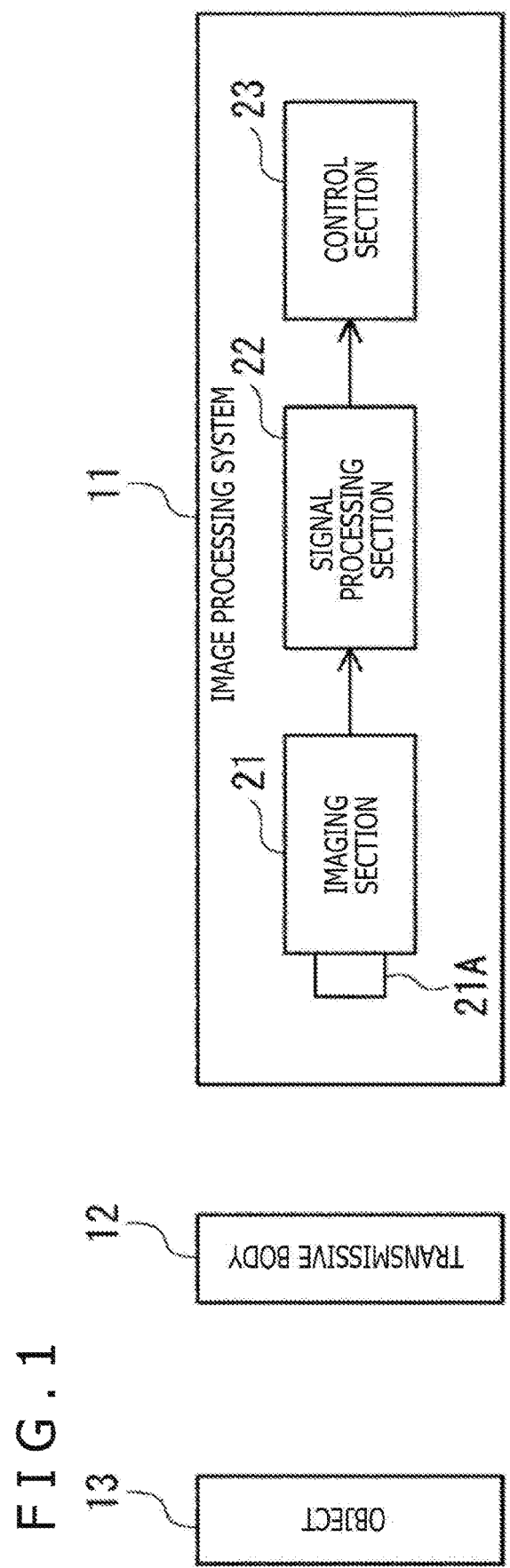
FIG. 1 is a block diagram illustrating a first embodiment of an image processing system to which the present technology is applied.

FIG. 1 illustrates an example configuration of an image processing system 11 according to a first embodiment of the present technology.

The image processing system 11 captures an image of an object 13 through a transmissive body 12 disposed between the object 13 and the image processing system 11, and performs various processes by using the obtained image (hereinafter referred to as the captured image).

The transmissive body 12 is a transparent or translucent body that allows light to pass through, and includes, for example, a visor of a wearable device for AR (Augmented Reality) or VR (Virtual Reality) or a windshield of a vehicle. Light from the object 13 is transmitted through the transmissive body 12 and incident on a lens 21A of an imaging section 21.

It should be noted that the transmissive body 12 may be included in the image processing system 11. Stated differently, the transmissive body 12 may be a part of the image processing system 11.

The imaging section 21 includes, for example, a camera having the lens 21A. The lens 21A may be integral with the imaging section 21. Alternatively, a part or the whole of the lens 21A may be detachable from the imaging section 21. The imaging section 21 captures an image formed by light from the object 13 that is transmitted through the transmissive body 12 and the lens 21A, and supplies the obtained image to a signal processing section 22.

The signal processing section 22 performs various processes on the captured image. For example, the signal processing section 22 performs a process of estimating distortion caused by the transmissive body 12 (hereinafter referred to as transmissive body distortion) and distortion cause by the lens 21A (hereinafter referred to as lens distortion), and performs a process of correcting the estimated distortions. The signal processing section 22 supplies, to a control section 23, the captured image that is corrected for transmissive body distortion and lens distortion.

The control section 23 performs various processes by using the captured image. For example, the control section 23 displays, processes, records, and transmits the captured image, and performs an objection recognition process and a distance measurement process by using the captured image.

<Example Configuration of Signal Processing Section 22>

Figure 2:
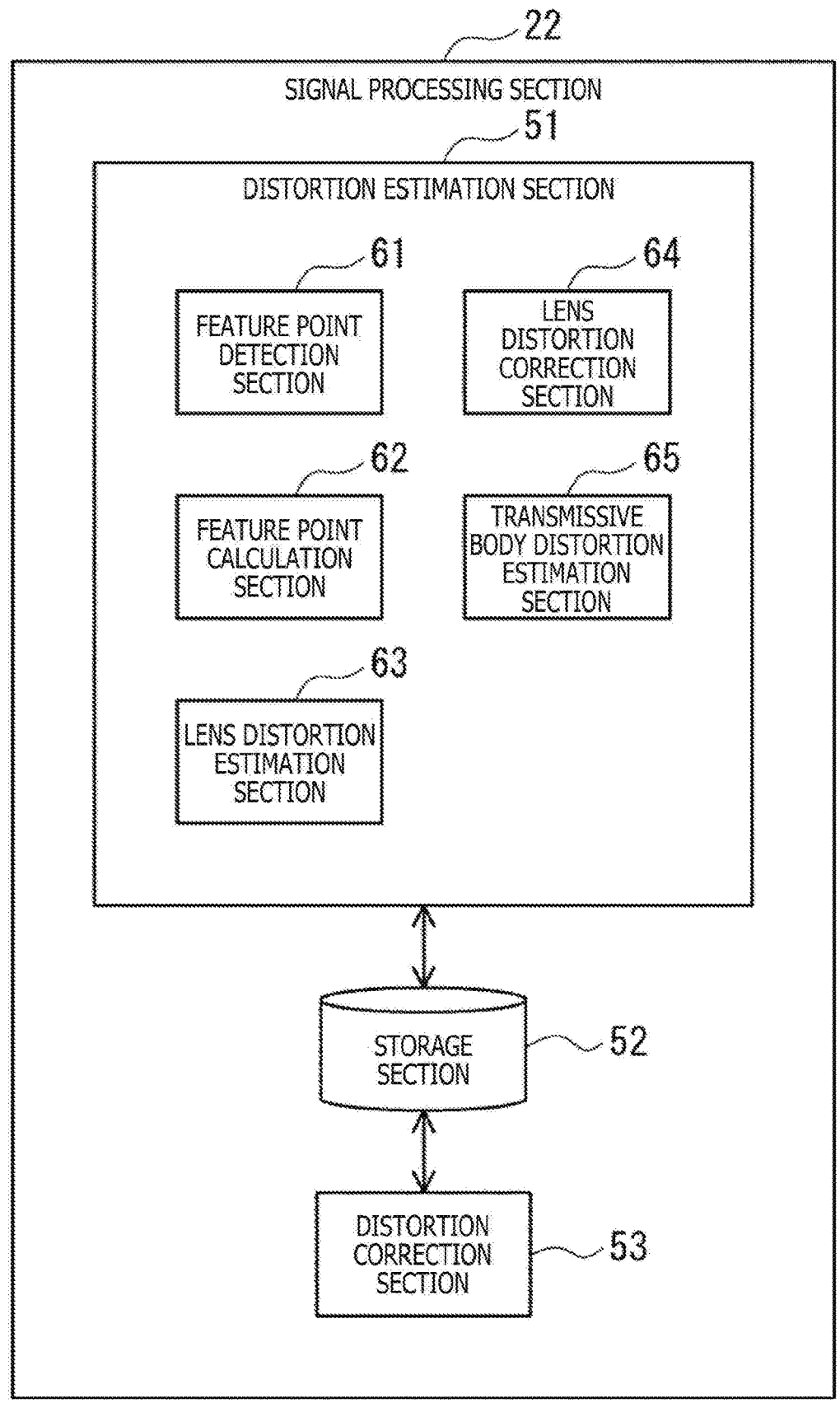
FIG. 2 is a block diagram illustrating an example configuration of a signal processing section depicted in FIG. 1.

FIG. 2 illustrates an example configuration of the signal processing section 22 depicted in FIG. 1. The signal processing section 22 includes a distortion estimation section 51, a storage section 52, and a distortion correction section 53.

The distortion estimation section 51 performs a process of estimating transmissive body distortion and lens distortion. The distortion estimation section 51 includes a feature point detection section 61, a feature point calculation section 62, a lens distortion estimation section 63, a lens distortion correction section 64, and a transmissive body distortion estimation section 65.

The feature point detection section 61 performs a process of detecting a feature point in an image.

The feature point calculation section 62 calculates the location of a feature point in an undistorted ideal image.

The lens distortion estimation section 63 performs a process of estimating lens distortion.

The lens distortion correction section 64 performs a process of correcting (removing) lens distortion in an image.

The transmissive body distortion estimation section 65 performs a process of estimating transmissive body distortion.

The storage section 52 stores, for example, information indicating the results of estimation of lens distortion and transmissive body distortion.

The distortion correction section 53 performs a process of correcting (removing) lens distortion and transmissive body distortion in an image.

<Processes Performed by Image Processing System 11>

Processes performed by the image processing system 11 will now be described with reference to FIGS. 3 to 10.

<Distortion Estimation Process>

First of all, a distortion estimation process performed by the image processing system 11 will be described with reference to the flowchart of FIG. 3.

In step S1, the imaging section 21 captures a calibration image.

More specifically, a calibration chart having a known pattern is disposed, as the object 13, in front of the transmissive body 12 before image capture. Stated differently, the transmissive body 12 is disposed between the lens 21A and the calibration chart.

Figure 4:
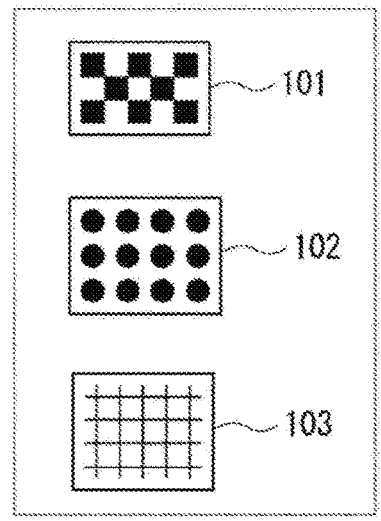
FIG. 4 is a diagram illustrating examples of a calibration chart.

Any calibration chart may be used as far as it has a known pattern. However, for example, calibration charts 101 to 103 depicted in FIG. 4 are used.

The calibration charts 101 to 103 have predetermined patterns. More specifically, the calibration chart 101 has a checkerboard pattern in which rectangles of known vertical and horizontal dimensions are arranged in a grid-like pattern. The calibration chart 102 has a circle grid pattern in which circles with a known radius are arranged in a grid-like pattern. The calibration chart 103 has a grid pattern in which there is a known distance between intersections.

The imaging section 21 captures an image of a calibration chart, and supplies the obtained image (hereinafter referred to as the real calibration image) to the signal processing section 22. The real calibration image is an image captured through the transmissive body 12 and the lens 21A. Therefore, the real calibration image contains transmissive body distortion caused by the transmissive body 12 and lens distortion caused by the lens 21A.

In step S2, the feature point detection section 61 detects a feature point in the captured real calibration image (real calibration image).

Any method may be used to detect a feature point in the real calibration image. For example, a method appropriate for the pattern of the calibration chart is used.

For example, the Moravec method or the Harris method is used for the calibration chart 101 having a checkerboard pattern depicted in FIG. 4.

For example, the Hough conversion is used for the calibration chart 102 having a circle grid pattern depicted in FIG. 4 or the calibration chart 103 having a grid pattern.

In step S3, the feature point calculation section 62 calculates the location of a feature point in an undistorted ideal calibration image (hereinafter referred to as the ideal calibration image).

Figure 5:
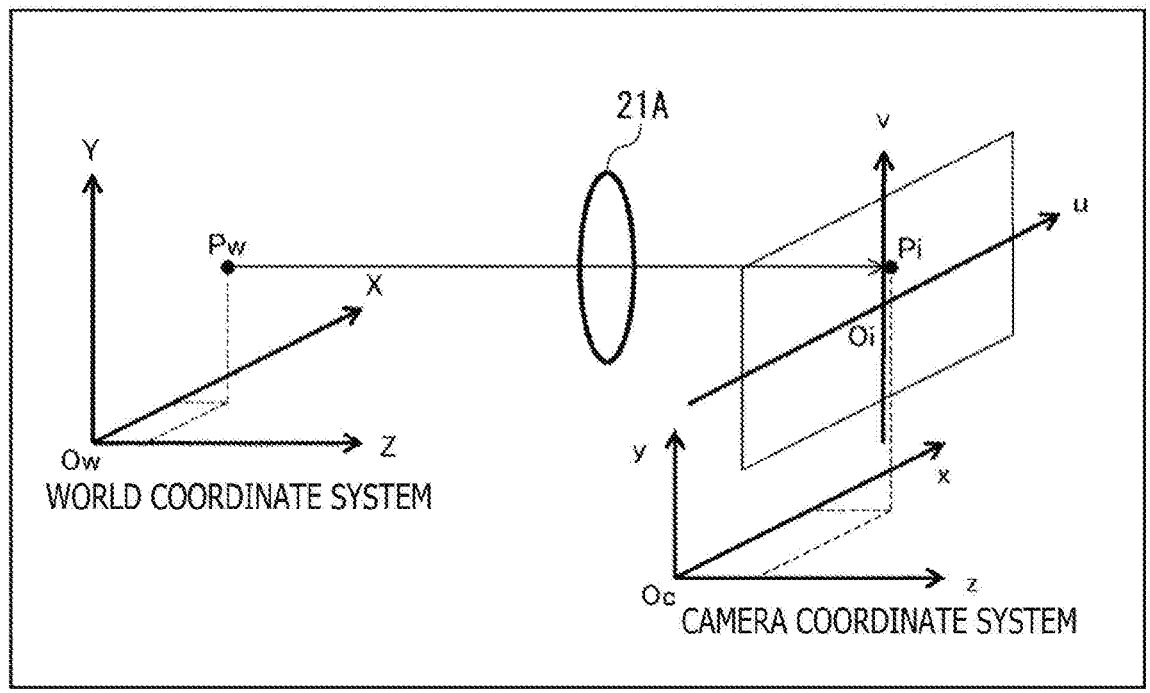
FIG. 5 is a diagram illustrating the relationship between a world coordinate system, a camera coordinate system, and an ideal image coordinate system.

FIG. 5 illustrates an undistorted ideal pinhole model of the imaging section 21. FIG. 5 depicts a world coordinate system, a camera coordinate system, and a coordinate system of an undistorted ideal image (hereinafter referred to as the ideal image coordinate system).

The world coordinate system is referenced to the origin Ow, and has X-, Y-, and Z-axes that are orthogonal to each other.

The camera coordinate system is referenced to the origin Oc, and has x-, y-, and z-axes that are orthogonal to each other. It should be noted that the z-axis is parallel to the optical axis of the lens 21A.

The ideal image coordinate system is referenced to the origin Oi, and has u- and v-axes that are orthogonal to each other. Further, it is assumed that the origin Oi is a point in the ideal image coordinate system and corresponds to the center of the lens 21A (the central point in an undistorted ideal image (hereinafter referred to as the ideal image)). It is also assumed that u-axis is a horizontal axis of the ideal image, and that the v-axis is a vertical axis of the ideal image.

If, in the above instance, the x-axis focal length of the imaging section 21 is fx, the y-axis focal length of the imaging section 21 is fy, the x- and y-axis coordinates of an optical center are cx and cy, respectively, and a skew coefficient is skew-coeff, an internal matrix K, that is, an internal parameter of the imaging section 21, is expressed by Equation (1) below:

[Math. 1]

$$K = \begin{bmatrix} fx & skew\_coeff & cx \\ 0 & fy & cy \\ 0 & 0 & 1 \end{bmatrix} \quad (1)$$

Further, the relationship between the world coordinate system and the camera coordinate system is indicated by a rotation component R, that is, an external parameter of the imaging section 21, and by a translation component t. The rotation component R and the translation component t are respectively expressed by Equations (2) and (3) below:

[Math. 2]

$$R = \begin{bmatrix} r_1 & r_2 & r_3 \\ r_4 & r_5 & r_6 \\ r_7 & r_8 & r_9 \end{bmatrix} \quad (2)$$

$$t = \begin{bmatrix} t_x \\ t_y \\ t_z \end{bmatrix} \quad (3)$$

Then, the relationship between a point Pw(X, Y, Z) in the world coordinate system and a point Pi(u, v) in the ideal image coordinate system that corresponds to the point Pw is expressed by Equation (4) below:

[Math. 3]

$$\begin{bmatrix} u \\ v \\ 1 \end{bmatrix} = K[R|t] \begin{bmatrix} X \\ Y \\ Z \\ 1 \end{bmatrix} \quad (4)$$

It should be noted that [R|t] in Equation (4) is expressed by Equation (5) below:

[Math. 4]

$$[R|t] = \begin{bmatrix} R & t \\ 0 & 1 \end{bmatrix} \quad (5)$$

In Equation (5), the internal matrix K is a design value and known. Further, the rotation component R and the translation component t are known as far as the positional relationship between the calibration chart and the imaging section 21 is clarified.

Subsequently, when the origin Ow of the world coordinate system is set in the calibration chart, the location of the feature point in the calibration chart within the ideal image coordinate system is calculated by Equation (4) because the internal matrix K, the rotation component R, and the translation component t are known.

The feature point calculation section 62 then calculates the location of the feature point in the ideal calibration image in accordance with Equation (4).

In step S4, the lens distortion estimation section 63 estimates lens distortion based on the location of the feature point in the ideal calibration image and the location of the feature point in the real calibration image.

Figure 6:
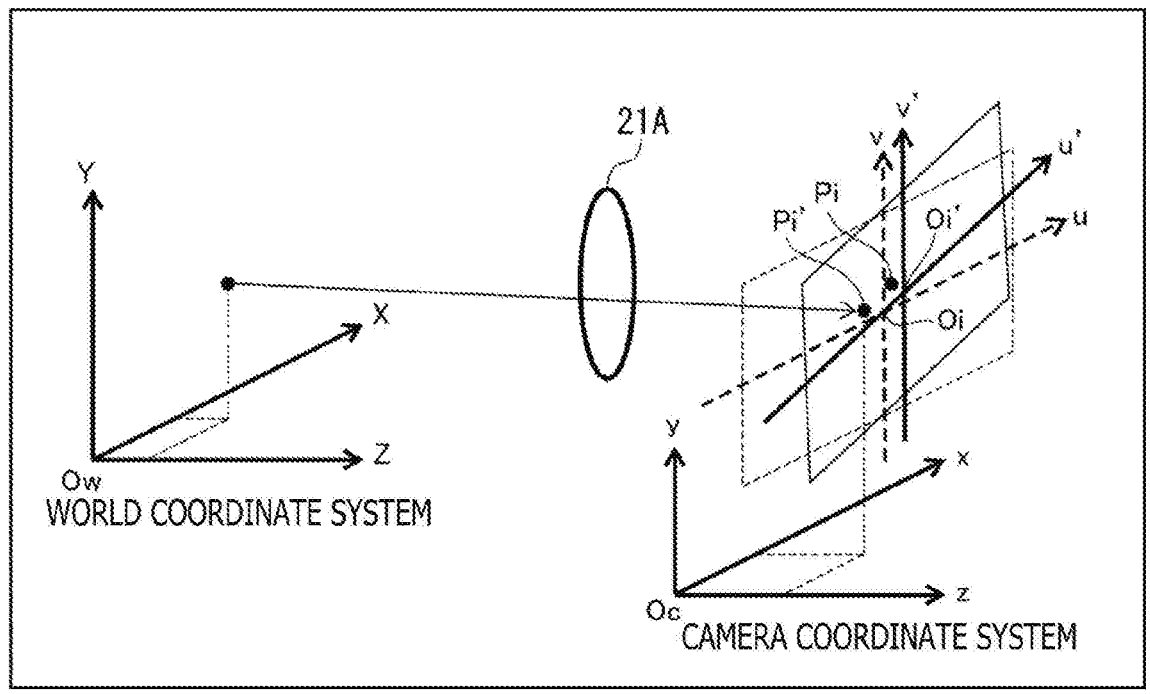
FIG. 6 is a diagram illustrating the relationship between a world coordinate system, a camera coordinate system, an ideal image coordinate system, and a real image coordinate system.

FIG. 6 is a diagram illustrating a coordinate system of a captured image actually captured by the imaging section 21 (hereinafter referred to as the real image coordinate system) in addition to the coordinate system depicted in FIG. 5. It should be noted that FIG. 6 uses dotted lines to indicate the ideal image coordinate system.

The real image coordinate system is referenced to the origin Oi', and has u'- and v'-axes that are orthogonal to each other. Further, it is assumed that the origin Oi' is a point in the real image coordinate system and corresponds to the center of the lens 21A. It is also assumed that u'-axis is a horizontal axis of the captured image, and that the v'-axis is a vertical axis of the captured image.

For example, the lens distortion estimation section 63 uses a predetermined lens distortion model to estimate a lens distortion function indicative of lens distortion caused by the lens 21A.

The lens distortion function may be estimated by using an appropriate lens distortion model. In a case where the adopted lens distortion model is proposed, for example, by "Brown, D. C., Close-Range Camera Calibration, Photogrammetric Engineering 37(8), 1971, pp. 855-866" (hereinafter referred to as Non-patent Literature 1) or by "Fryer, J. G. and one other, Lens distortion for close-range photogrammetry, Photogrammetric Engineering and Remote Sensing (ISSN 0099-1112), January 1986, vol. 52, pp. 51-58" (hereinafter referred to as Non-patent Literature 2), a lens distortion function fdlu(u, v) and a lens distortion fdlv(u, v) are expressed by Equations (6) and (7) below.

[Math. 5]

$$uL = fdlu(u, v) \quad (6)$$
$$= \frac{1 + k_1 r^2 + k_2 r^4 + k_3 r^6}{1 + k_4 r^2 + k_5 r^4 + k_6 r^6} + 2p_1 uv + p_2(r^2 + 2u^2)$$

$$vL = fdlv(u, v) \quad (7)$$
$$= v\frac{1 + k_1 r^2 + k_2 r^4 + k_3 r^6}{1 + k_4 r^2 + k_5 r^4 + k_6 r^6} + p_1(r^2 + 2v^2)uv + 2p_2 uv$$

The lens distortion function fdlu(u, v) and the lens distortion fdlv(u, v) indicate the correspondence between the coordinates (u, v) of an image free of lens distortion and the coordinates (uL, vL) of a lens-distorted image.

It should be noted that r in Equations (6) and (7) represents the distance between the coordinates (u, v) of the ideal image coordinate system and its origin Oi, and that r2=u2+v2. Further, the symbols k1 to k6 and p1 and p2 in Equations (6) and (7) represent coefficients (hereinafter referred to as the lens distortion coefficients). Therefore, the lens distortion function is estimated by determining each lens distortion coefficient.

For example, the lens distortion estimation section 63 regards the location (coordinates) of the feature point in the ideal calibration image as an explanatory variable, regards the location (coordinates) of the feature point in the real calibration image captured by the imaging section 21 as an objective variable, and estimates each of the lens distortion coefficients in Equations (6) and (7) by using a nonlinear optimization method. For example, the Newton's method, the LM method, or other appropriate method may be used as the nonlinear optimization method.

The lens distortion estimation section 63 then causes the storage section 52 to store information indicative of the lens distortion function fdlu(u, v) and the lens distortion fdlu(u, v).

As described above, the lens distortion function indicative of lens distortion is estimated based on the difference between the calculated location of the feature point in the ideal calibration image and the location of the feature point in the actually captured real calibration image.

It should be noted that the real calibration image contains transmissive body distortion in addition to the lens distortion. However, a model representative of lens distortion is different from a later-described model representative of transmissive body distortion. Therefore, when the predetermined lens distortion model is applied to the real calibration image containing both the lens distortion and the transmissive body distortion, it is possible to separate the lens distortion and the transmissive body distortion from each other, and estimate the lens distortion function.

Returning to FIG. 3, in step S5, the distortion estimation section 51 performs a transmissive body distortion estimation process. Upon completion of step S5, the distortion estimation process ends.

Figure 7:
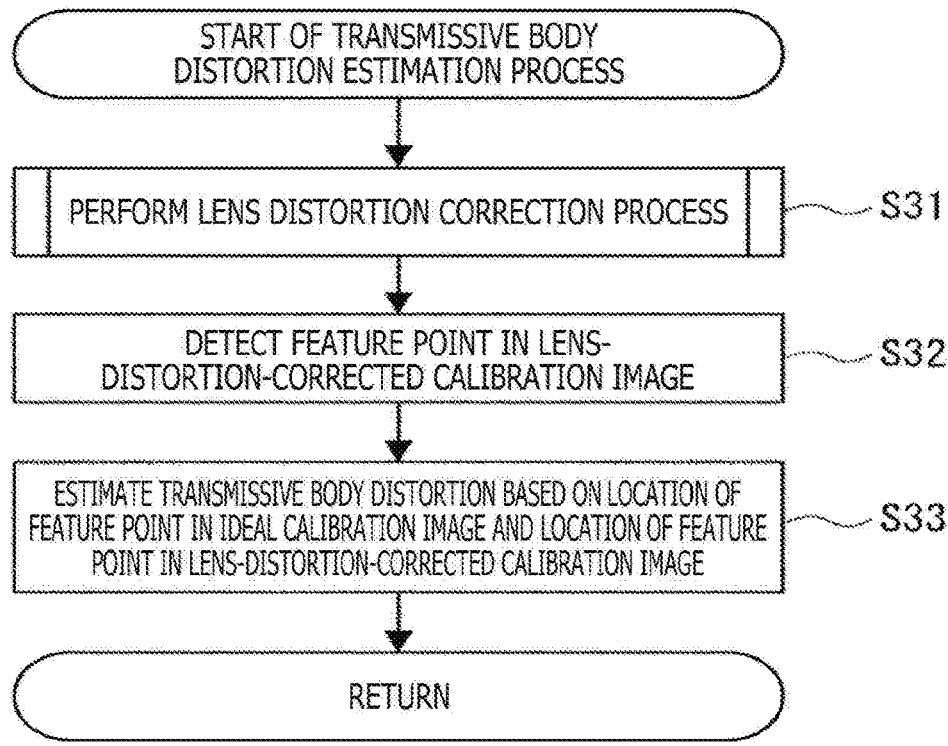
FIG. 7 is a diagram illustrating the details of a transmissive body distortion estimation process.

The transmissive body distortion estimation process will now be described in detail with reference to the flowchart of FIG. 7.

In step S31, the lens distortion correction section 64 performs a lens distortion correction process.

Referring now to the flowchart of FIG. 8, the lens distortion correction process will be described in detail.

In step S61, the lens distortion correction section 64 selects one of pixels uncorrected for lens distortion.

In step S62, the lens distortion correction section 64 converts the coordinates (u, v) of the selected pixel to the coordinates (uL, vL) by using the lens distortion function. More specifically, the lens distortion correction section 64 converts the coordinates (u, v) to the coordinates (uL, vL) by using the lens distortion function given by Equations (6) and (7) above.

In step S63, the lens distortion correction section 64 sets the pixel value of the coordinates (uL, vL) of the real calibration image as the pixel value of the selected pixel. As a result, the pixel value of the coordinates (uL, vL) of the real calibration image is set for a pixel at the coordinates (u, v) of a calibration image corrected for lens distortion (hereinafter referred to as the lens-distortion-corrected calibration image).

In step S64, the lens distortion correction section 64 determines whether or not all pixels are corrected for lens distortion. In a case where it is determined that all pixels are not corrected for lens distortion, processing returns to step S61.

Subsequently, steps S61 to S64 are repeatedly performed until it is determined in step S64 that all pixels are corrected for lens distortion.

Meanwhile, in a case where it is determined in step S64 that all pixels are corrected for lens distortion, the lens distortion correction process ends.

As described above, the lens-distortion-corrected calibration image, which is obtained by removing the estimated lens distortion from the real calibration image, is generated by using the lens distortion function.

Returning to FIG. 7, in step S32, the feature point detection section 61 detects a feature point in the calibration image corrected for lens distortion (lens-distortion-corrected calibration image). More specifically, the feature point detection section 61 detects the feature point in the lens-distortion-corrected calibration image by performing processing similar to that performed in step S2 depicted in FIG. 3.

In step S33, the transmissive body distortion estimation section 65 estimates the transmissive body distortion in accordance with the feature point in the undistorted ideal calibration image (ideal calibration image) and the feature point in the calibration image corrected for lens distortion (lens-distortion-corrected calibration image).

For example, the transmissive body distortion estimation section 65 uses a predetermined transmissive body distortion model to estimate a transmissive body distortion function indicative of the transmissive body distortion caused by the transmissive body 12.

An appropriate transmissive body distortion model may be used for the transmissive body distortion function. In a case, for example, where a transmissive body distortion model based on a two-variable Nth-order polynomial is used, a transmissive body distortion function fdtu(u, v) and a transmissive body distortion function fdtv(u, v) are expressed by Equations (8) and (9) below:

$$uT = fdtu(u, v) \qquad (8)$$
$$= C_u + a_{u1}u + a_{u2}v + a_{u3}u^2 + a_{u4}v^2 + a_{u5}uv + a_{u6}u^3 \ldots$$

$$vT = fdtv(u, v) \qquad (9)$$
$$= C_v + a_{v1}u + a_{v2}v + a_{v3}u^2 + a_{v4}v^2 + a_{v5}uv + a_{v6}u^3 \ldots$$

The transmissive body distortion function fdtu(u, v) and the transmissive body distortion function fdtv(u, v) indicate the correspondence between the coordinates (u, v) of an image free of transmissive body distortion and the coordinates (uT, vT) of a transmissive-body-distorted image.

It should be noted that $C_u$, $C_v$, $a_{u1}$, $a_{u2}$, $a_{u3}$, $a_{u4}$, $a_{u5}$, $a_{u6}$, and so on and $a_{v1}$, $a_{v2}$, $a_{v3}$, $a_{v4}$, $a_{v5}$, $a_v$, and so on are coefficients (hereinafter referred to as the transmissive body distortion coefficients). Therefore, the transmissive body distortion functions are estimated by determining each of the transmissive body distortion coefficients.

For example, the transmissive body distortion estimation section 65 regards the location (coordinates) of the feature point in the ideal calibration image as an explanatory variable, regards the location (coordinates) of the feature point in the lens-distortion-corrected calibration image as an objective variable, and estimates each of the transmissive body distortion coefficients in Equations (8) and (9) by using a nonlinear optimization method. For example, the Newton's method, the LM method, or other appropriate method may be used as the nonlinear optimization method.

The transmissive body distortion estimation section 65 then causes the storage section 52 to store information indicative of the transmissive body distortion function fdtu (u, v) and the transmissive body distortion function fdtu(u, v).

As described above, the transmissive body distortion functions indicative of transmissive body distortion are estimated based on the difference between the calculated location of the feature point in the ideal calibration image and the location of the feature point in the lens-distortion-corrected calibration image, which is obtained by removing the lens distortion from the real calibration image.

Subsequently, the transmissive body distortion estimation process ends.

As described above, the lens distortion and the transmissive body distortion can easily be estimated simply by capturing a calibration image through the transmissive body 12 and the lens 21A. Stated differently, it is not necessary to capture a calibration image two times, that is, once in a state where the transmissive body 12 is remove and once in a state where the transmissive body 12 is installed. Further, no special processes and apparatuses are required. This reduces the load on and shortens the time required for distortion estimation processing.

<Imaging Process>

An imaging process performed by the image processing system 11 will now be described with reference to the flowchart of FIG. 9.

In step S101, the imaging section 21 captures an image. More specifically, the imaging section 21 captures an image of the object 13, and supplies the obtained captured image to the signal processing section 22. The captured image is an image that is captured through the transmissive body 12 and the lens 21A. Therefore, the captured image contains transmissive body distortion caused by the transmissive body 12 and lens distortion caused by the lens 21A.

In step S102, a distortion correction process is performed.

Figure 10:
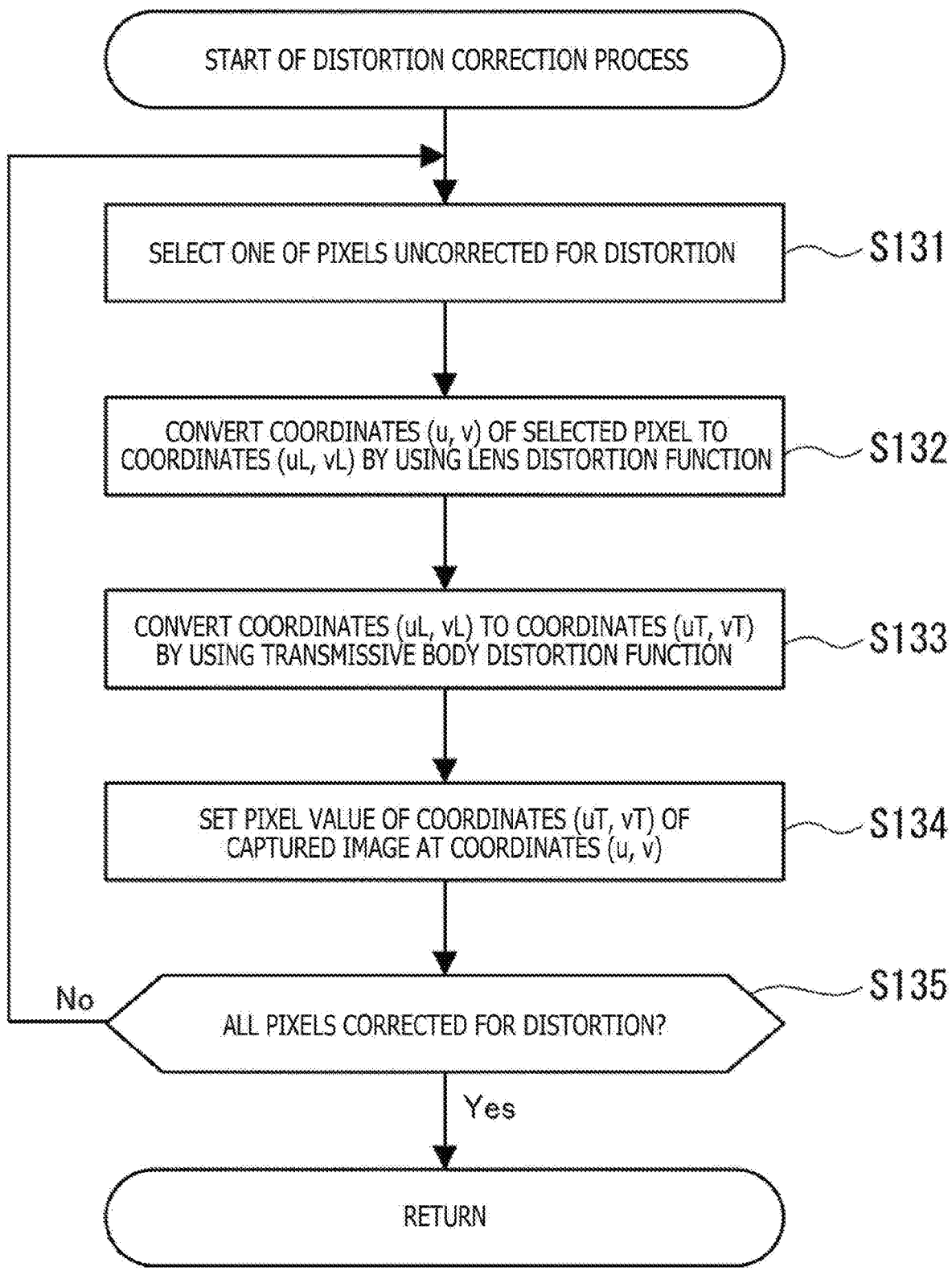
FIG. 10 is a diagram illustrating the details of a distortion correction process.

Referring now to the flowchart of FIG. 10, the distortion correction process will be described in detail.

In step S131, the distortion correction section 53 selects one of pixels uncorrected for distortion.

In step S132, the distortion correction section 53 converts the coordinates (u, v) of the selected pixel to the coordinates (uL, vL) by using the lens distortion function. More specifically, the distortion correction section 53 converts the coordinates (u, v) to the coordinates (uL, vL) by using the lens distortion function given by Equations (6) and (7) above.

In step S133, the distortion correction section 53 converts the coordinates (uL, vL) to the coordinates (uT, vT) by using the transmissive body distortion functions. More specifically, the distortion correction section 53 converts the coordinates (uL, vL) to the coordinates (uT, vT) by using the transmissive body distortion functions given by Equations (8) and (9) above.

The coordinates (uT, vT) indicate the coordinates of a destination pixel to which a pixel at the coordinates (u, v) of the undistorted ideal image (ideal image) is to be moved by lens distortion and transmissive body distortion.

In step S134, the distortion correction section 53 sets the pixel value of the coordinates (uT, vT) of a captured image at the coordinates (u, v). As a result, the pixel value of the coordinates (uT, VT) of an uncorrected captured image is set for a pixel at the coordinates (u, v) of a captured image corrected for distortion (hereinafter referred to as the distortion-corrected image).

In step S135, the distortion correction section 53 determines whether or not all pixels are corrected for distortion. In a case where it is determined that all pixels are not corrected for distortion, processing returns to step S131.

Subsequently, steps S131 to S135 are repeatedly performed until it is determined in step S135 that all pixels are corrected for distortion.

Meanwhile, in a case where it is determined in step S135 that all pixels are corrected for distortion, the distortion correction process ends.

As described above, the distortion-corrected captured image, which is obtained by removing the estimated lens distortion and transmissive body distortion from the captured image, is generated by using the lens distortion and transparent body distortion functions.

Returning to FIG. 9, in step S103, the distortion-corrected image is outputted. More specifically, the distortion correction section 53 outputs the distortion-corrected captured image to the control section 23.

The control section 23 performs various processes by using the distortion-corrected captured image.

As described above, it is easy to correct unnatural distortion in a captured image that is caused by lens distortion and transmissive body distortion. This improves the quality of a captured image.

As a result, it is possible to obtain advantages, for example, of recording an undistorted captured image and improving the accuracy of object recognition and distance measurement based on a captured image.

2. Second Embodiment

A second embodiment of the present technology will now be described with reference to FIGS. 11 to 14.

As compared with the first embodiment, the second embodiment reduces the amount of computation required for the distortion correction process, and thus increases the speed of processing.

<Example Configuration of Image Processing System 201>

Figure 11:
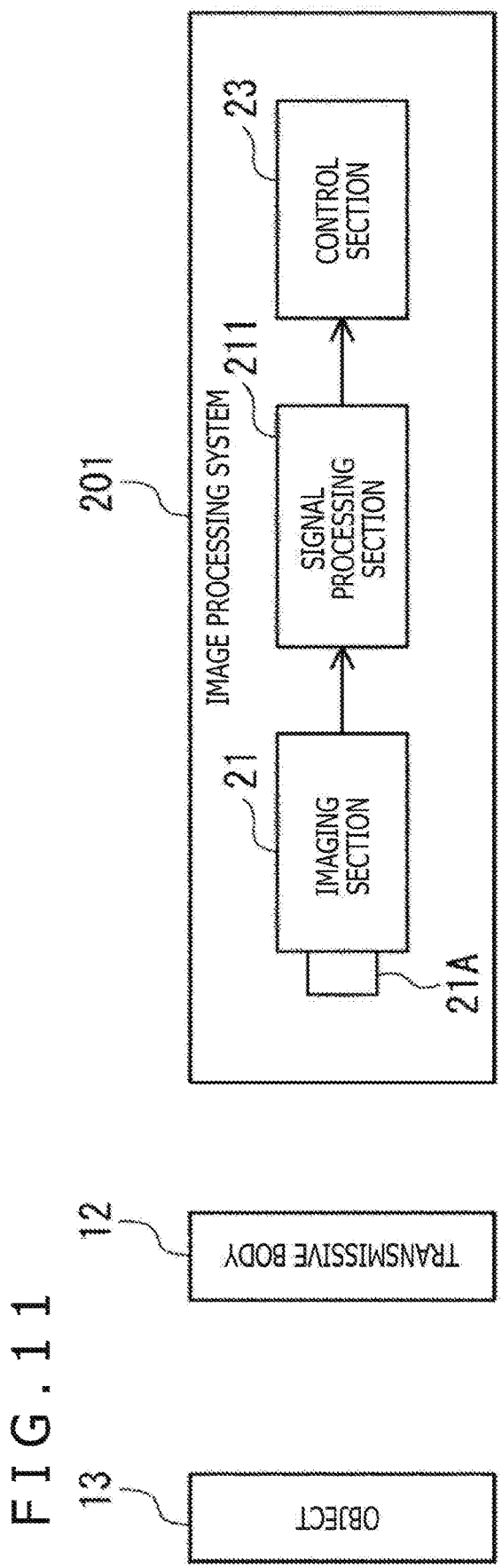
FIG. 11 is a block diagram illustrating a second embodiment of the image processing system to which the present technology is applied.

FIG. 11 illustrates an example configuration of an image processing system 201 according to the second embodiment of the present technology. It should be noted that elements depicted in FIG. 11 and corresponding to those in the image processing system 11 depicted in FIG. 1 are designated by the same reference symbols as the corresponding elements in FIG. 1, and in some cases will not be redundantly described.

The image processing system 201 differs from the image processing system 11 in that the former includes a signal processing section 211 instead of the signal processing section 22.

<Example Configuration of Signal Processing Section 211>

Figure 12:
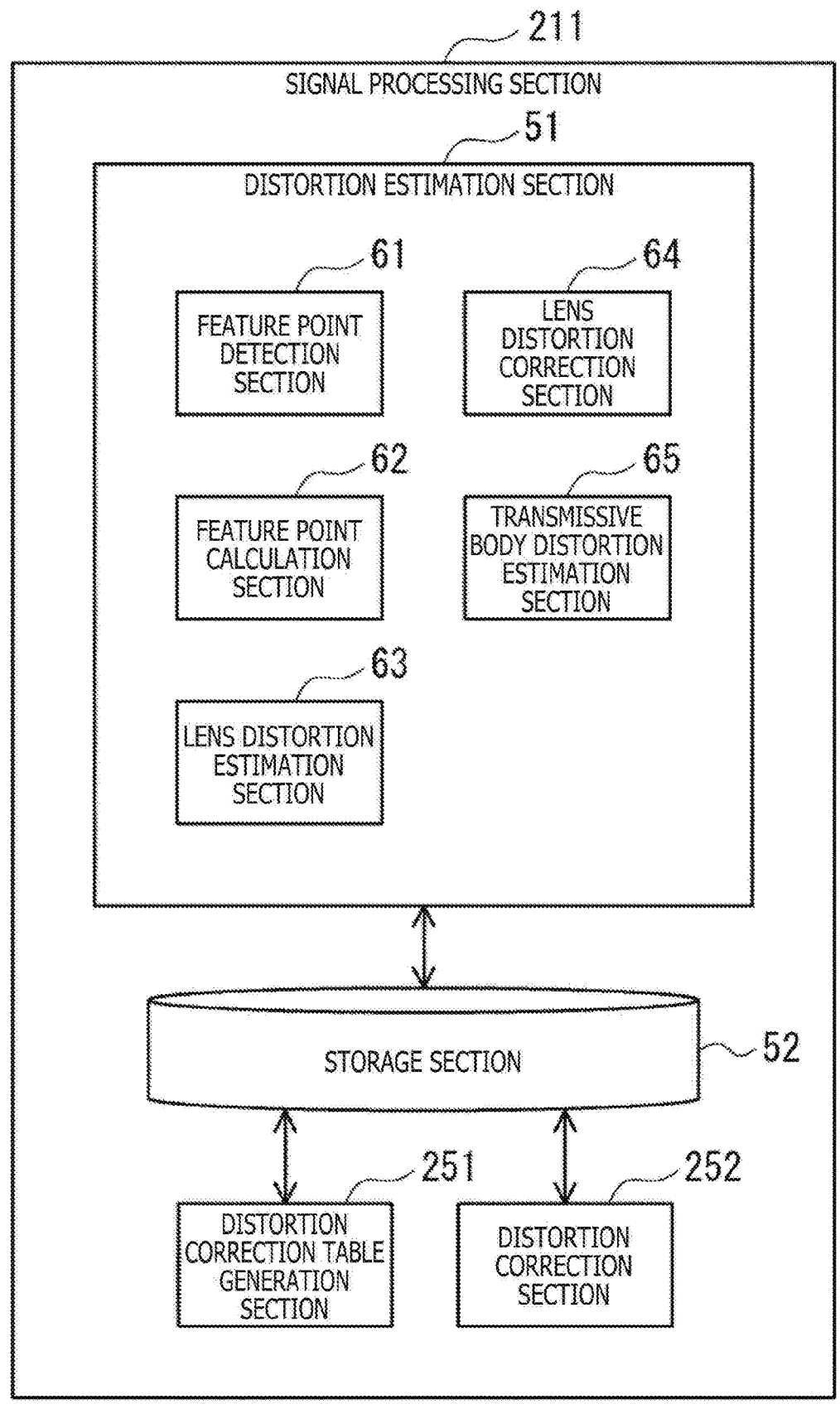
FIG. 12 is a block diagram illustrating an example configuration of a signal processing section depicted in FIG. 11.

FIG. 12 illustrates an example configuration of the signal processing section 211 depicted in FIG. 11. It should be noted that elements depicted in FIG. 12 and corresponding to those in the signal processing section 22 depicted in FIG. 2 are designated by the same reference numerals as the corresponding elements in FIG. 2, and in some cases will not be redundantly described.

The signal processing section 211 differs from the signal processing section 22 in that the former includes a distortion correction section 252 instead of the distortion correction section 53, and additionally includes a distortion correction table generation section 251.

The distortion correction table generation section 251 generates a distortion correction table and stores the generated distortion correction table in the storage section 52. The distortion correction table is a two-dimensional lookup table and used to correct distortion in a captured image.

The distortion correction section 252 corrects distortion in a captured image by using the distortion correction table.

<Processes Performed by Image Processing System 201>

Figure 13:
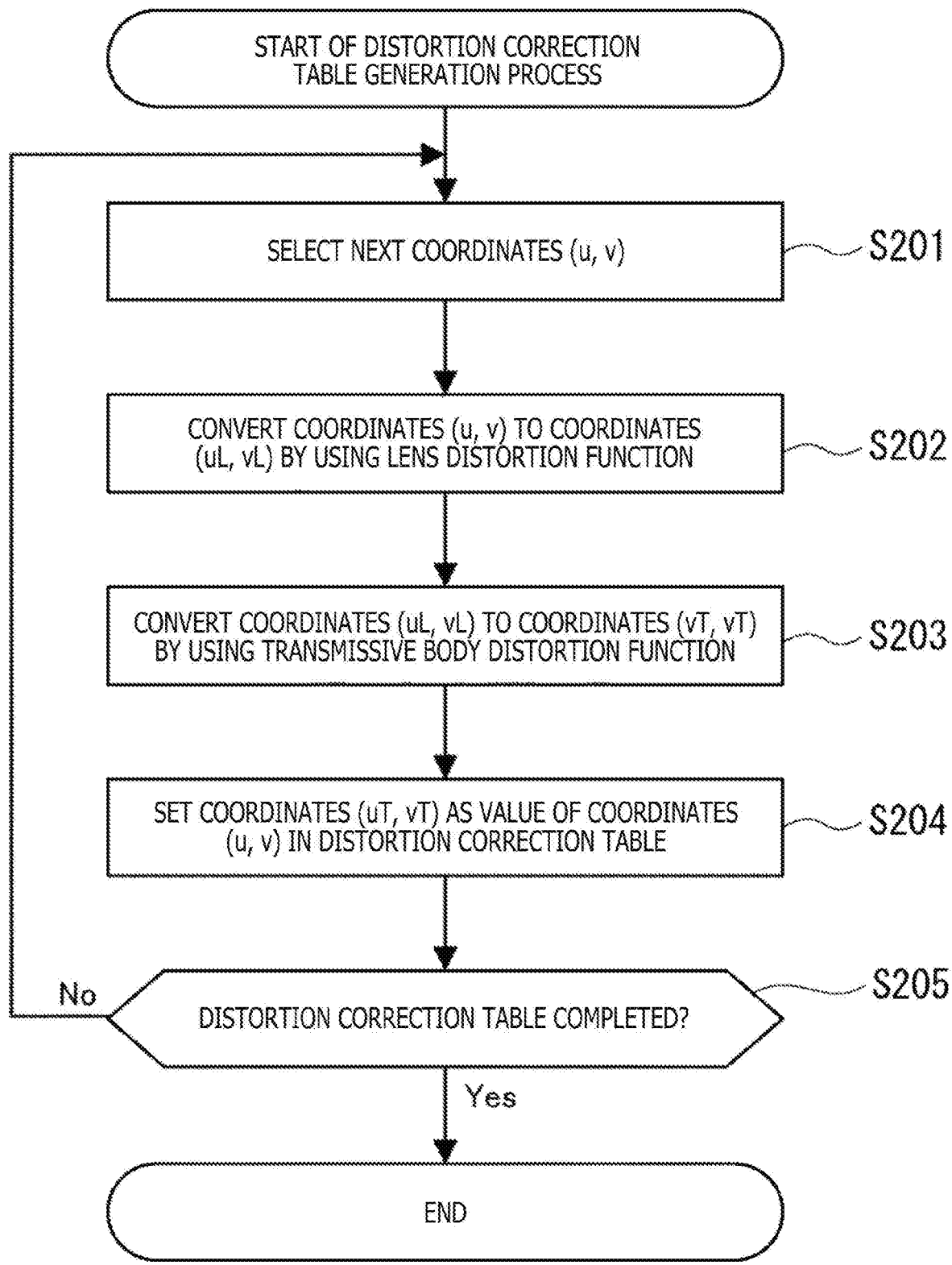
FIG. 13 is a flowchart illustrating a distortion correction table generation process that is performed by the image processing system depicted in FIG. 11.
Figure 14:
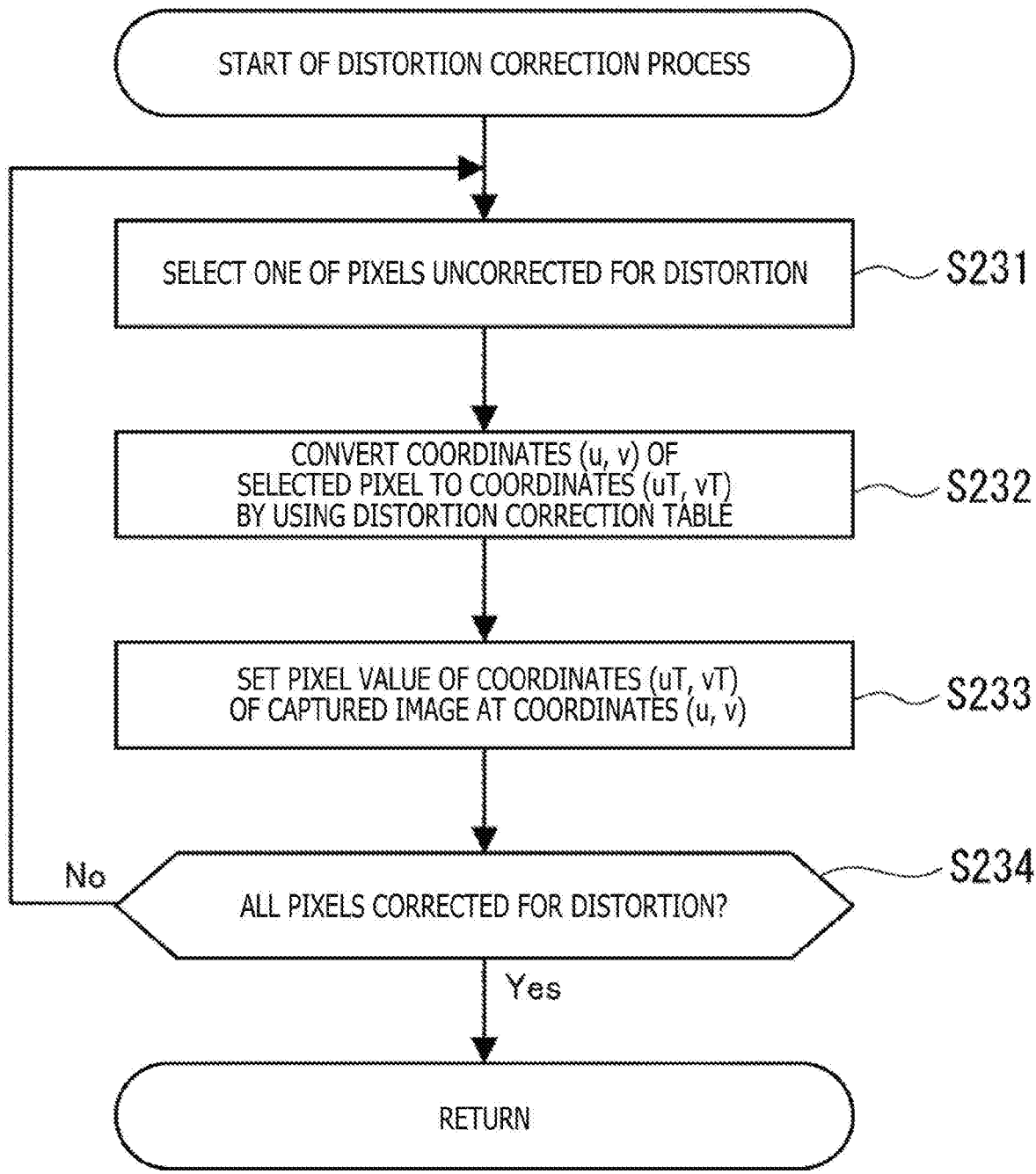
FIG. 14 is a flowchart illustrating a distortion correction process performed by the image processing system depicted in FIG. 11.

Processes performed by the image processing system 201 will now be described with reference to FIGS. 13 and 14.

It should be noted that a distortion estimation process performed by the image processing system 201 is similar to the distortion estimation process performed by the image processing system 11, which is described earlier with reference to FIG. 3, and will not be redundantly described.

<Distortion Correction Table Generation Process>

The distortion correction table generation process performed by the image processing system 201 will now be described with reference to the flowchart of FIG. 13.

In step S201, the distortion correction table generation section 251 selects the next coordinates (u, v).

The distortion correction table is a two-dimensional lookup table having the same configuration as the coordinate system of a captured image targeted for distortion correction. Data corresponding to each pixel in the captured image is set in the distortion correction table. Here, the distortion correction table generation section 251 selects a set of coordinates (u, v) in the distortion correction table at which no data is set yet.

In step S202, the distortion correction table generation section 251 converts the coordinates (u, v) to the coordinates (uL, vL) by using the lens distortion function. More specifically, the distortion correction table generation section 251 converts the coordinates (u, v) to the coordinates (uL, vL) by using the lens distortion function given by Equations (6) and (7) above.

In step S203, the distortion correction table generation section 251 converts the coordinates (uL, vL) to the coordinates (uT, vT) by using the transmissive body distortion functions. More specifically, the distortion correction table generation section 251 converts the coordinates (uL, vL) to the coordinates (uT, vT) by using the transmissive body distortion functions given by Equations (8) and (9) above.

In step S204, the distortion correction table generation section 251 sets the coordinates (uT, vT) as the value of coordinates (u, v) in the distortion correction table. Accordingly, the coordinates (uT, vT) of a destination pixel to which a pixel at the coordinates (u, v) is to be moved by lens distortion and transmissive body distortion are set for data at the coordinates (u, v) in the distortion correction table. Consequently, the distortion correction table indicates the correspondence between the location of a pixel in a case where transmissive body distortion and lens distortion do not exist (the location of a pixel in an ideal image) and the location of a pixel in a case where transmissive body distortion and lens distortion exist (the location of a pixel in a captured image).

In step S205, the distortion correction table generation section 251 determines whether or not the distortion correction table is completed. In a case where data is still not set at a certain set of coordinates in the distortion correction table, the distortion correction table generation section 251 determines that the distortion correction table is not completed yet. In this instance, processing returns to step S201.

Subsequently, steps S201 to S205 are repeatedly performed until it is determined in step S205 that the distortion correction table is completed.

Meanwhile, in a case where data is set at all sets of coordinates in the distortion correction table, the distortion correction table generation section 251 determines that the distortion correction table is completed. In this instance, the distortion correction table generation process ends.

<Imaging Process>

An imaging process performed by the image processing system 201 will now be described.

Figure 9:
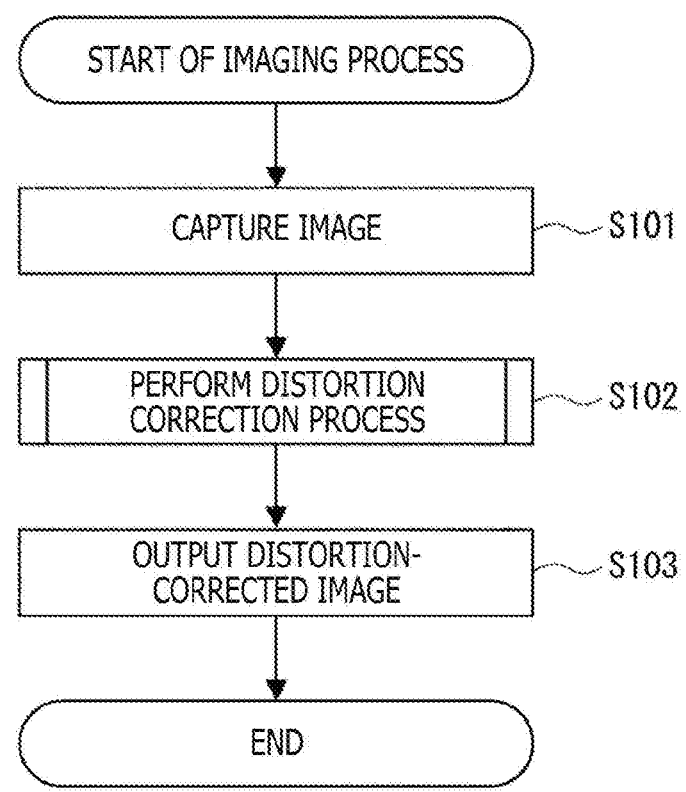
FIG. 9 is a flowchart illustrating an imaging process that is performed by the image processing system depicted in FIG. 1.

As is the case with the image processing system 11, the image processing system 201 performs the imaging process in accordance with the above-described flowchart of FIG. 9. However, it should be noted that a distortion correction process depicted in FIG. 14 is performed in step S102 of FIG. 9 instead of the distortion correction process depicted in FIG. 10.

More specifically, in step S231, the distortion correction section 252 selects one of pixels uncorrected for distortion.

In step S232, the distortion correction section 252 converts the coordinates (u, v) of the selected pixel to the coordinates (uT, vT) by using the distortion correction table.

In step S233, the distortion correction section 252 sets the pixel value of the coordinates (uT, vT) of a captured image at the coordinates (u, v). As a result, the pixel value of the coordinates (uT, vT) of an uncorrected captured image is set for a pixel at the coordinates (u, v) of a distortion-corrected image.

In step S234, the distortion correction section 252 determines whether or not all pixels are corrected for distortion. In a case where it is determined that all pixels are not corrected for distortion, processing returns to step S231.

Subsequently, steps S231 to S234 are repeatedly performed until it is determined in step S234 that all pixels are corrected for distortion.

Meanwhile, in a case where it is determined in step S234 that all pixels are corrected for distortion, the distortion correction process ends.

Figure 8:
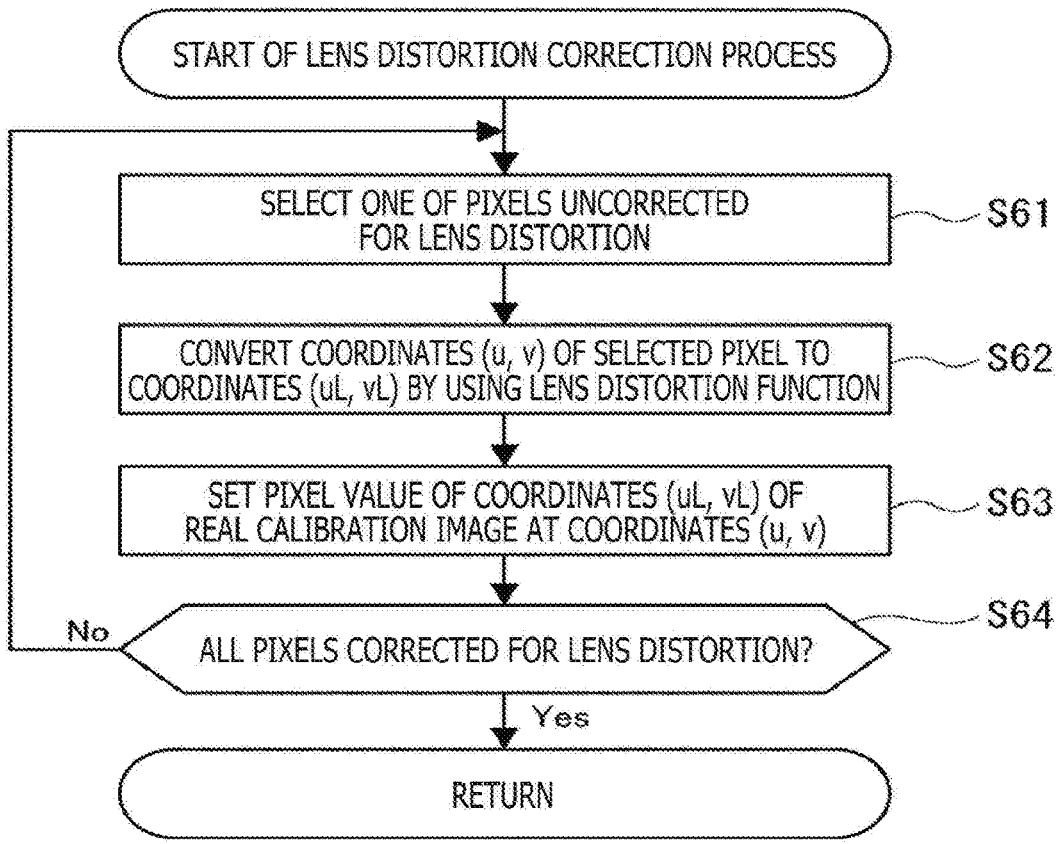
FIG. 8 is a diagram illustrating the details of a lens distortion estimation process.

As described above, using the distortion correction table makes it possible to reduce the amount of computation and increase the speed of processing as compared with the distortion correction process depicted in FIG. 8.

3. Third Embodiment

A third embodiment of the present technology will now be described with reference to FIGS. 15 to 18.

The first and second embodiments have been described in relation to processing that is performed in a case where the internal parameter (internal matrix K in Equation (1)) and external parameters (rotation component R in Equation (2) and translation component t in Equation (3)) of the imaging section 21 are known. Meanwhile, the third embodiment will be described in relation to processing that is performed in a case where the internal matrix K, the rotation component R, and the translation component t are unknown.

<Example Configuration of Image Processing System 301>

Figure 15:
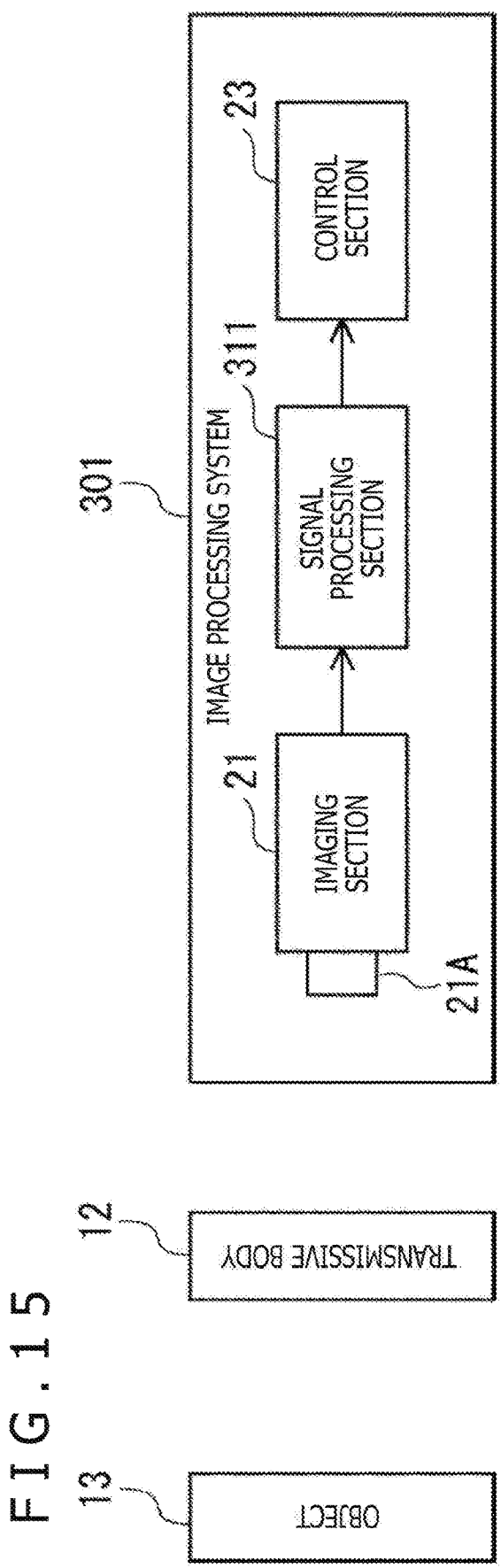
FIG. 15 is a block diagram illustrating a third embodiment of the image processing system to which the present technology is applied.

FIG. 15 illustrate an example configuration of an image processing system 301 according to the third embodiment of the present technology. It should be noted that elements depicted in FIG. 15 and corresponding to those in the image processing system 201 depicted in FIG. 11 are designated by the same reference numerals as the corresponding elements in FIG. 11, and in some cases will not be redundantly described.

The image processing system 301 differs from the image processing system 201 in that the former includes a signal processing section 311 instead of the signal processing section 211.

<Example Configuration of Signal Processing Section 311>

Figure 16:
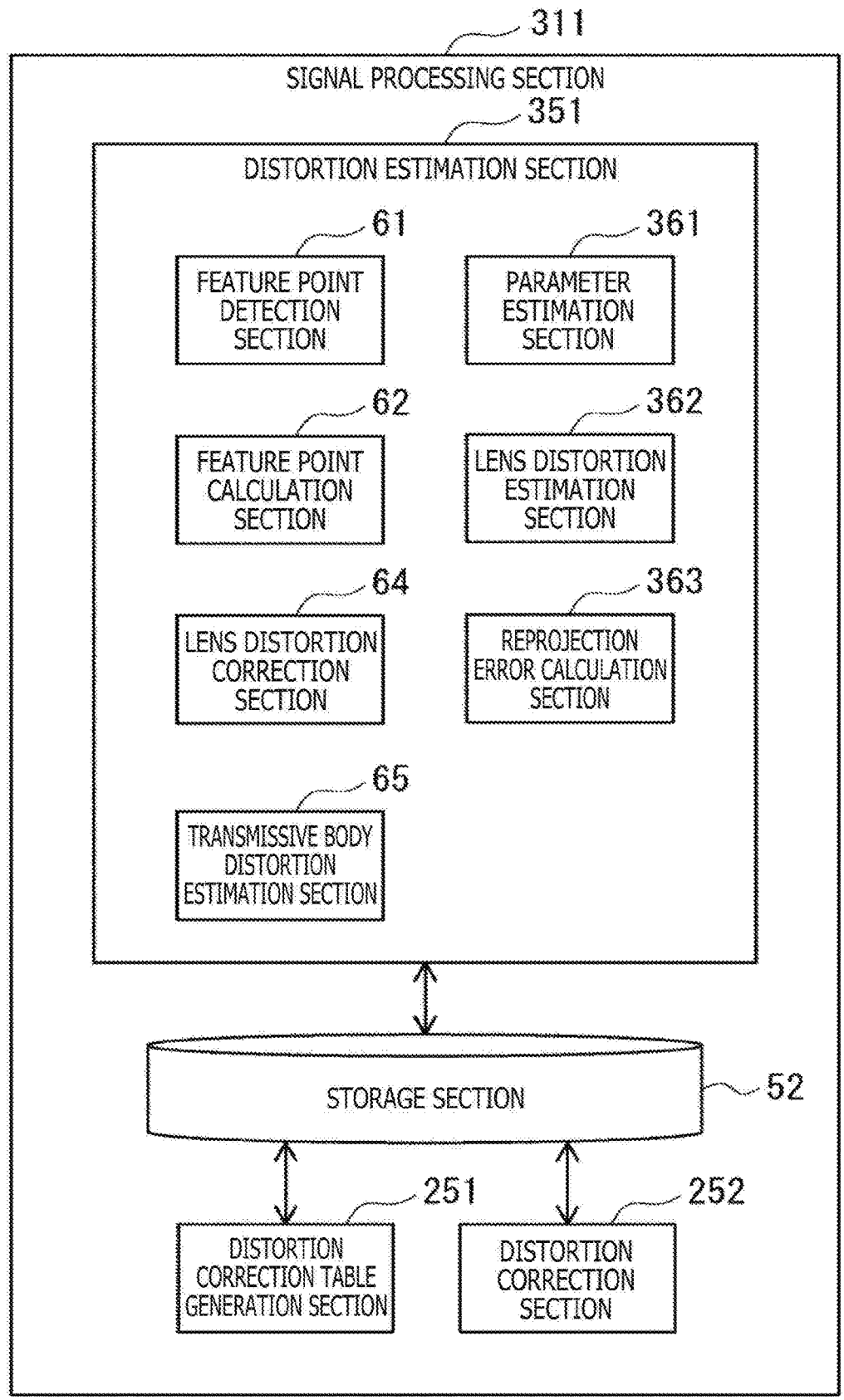
FIG. 16 is a block diagram illustrating an example configuration of a signal processing section depicted in FIG. 15.

FIG. 16 illustrates an example configuration of the signal processing section 311 depicted in FIG. 15. It should be noted that elements depicted in FIG. 16 and corresponding to those in the signal processing section 211 depicted in FIG. 12 are designated by the same reference numerals as the corresponding elements in FIG. 12, and in some cases will not be redundantly described.

The signal processing section 311 differs from the signal processing section 211 in that the former includes a lens distortion estimation section 362 instead of the lens distortion estimation section 63, and additionally includes a parameter estimation section 361 and a reprojection error calculation section 363.

The parameter estimation section 361 performs a process of estimating the internal and external parameters of the imaging section 21.

The lens distortion estimation section 362 performs a lens distortion estimation process in accordance with the estimated internal and external parameters of the imaging section 21.

The reprojection error calculation section 363 calculates a reprojection error. The reprojection error is an error between an image captured by the imaging section 21 and a distorted image. The distorted image is obtained by calculation, namely, by adding, to the captured image, transmissive body distortion estimated by the transmissive body distortion estimation section 65 and lens distortion estimated by the lens distortion estimation section 362. Further, the reprojection error calculation section 363 determines based on the reprojection error whether or not a process of estimating transmissive body distortion and lens distortion has converged.

<Processes Performed by Image Processing System 301>

Figure 17:
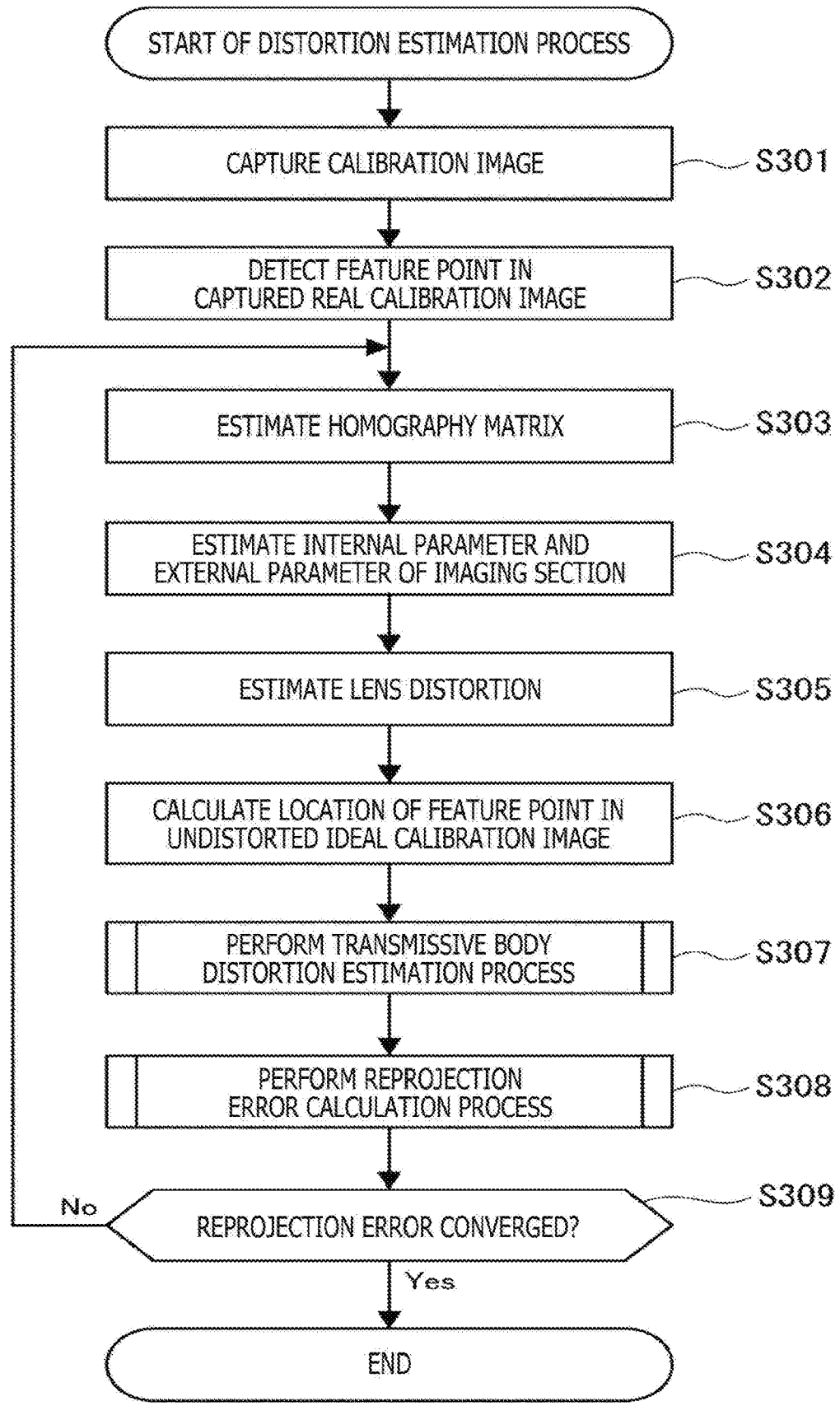
FIG. 17 is a flowchart illustrating a distortion estimation process that is performed by the image processing system depicted in FIG. 15.
Figure 18:
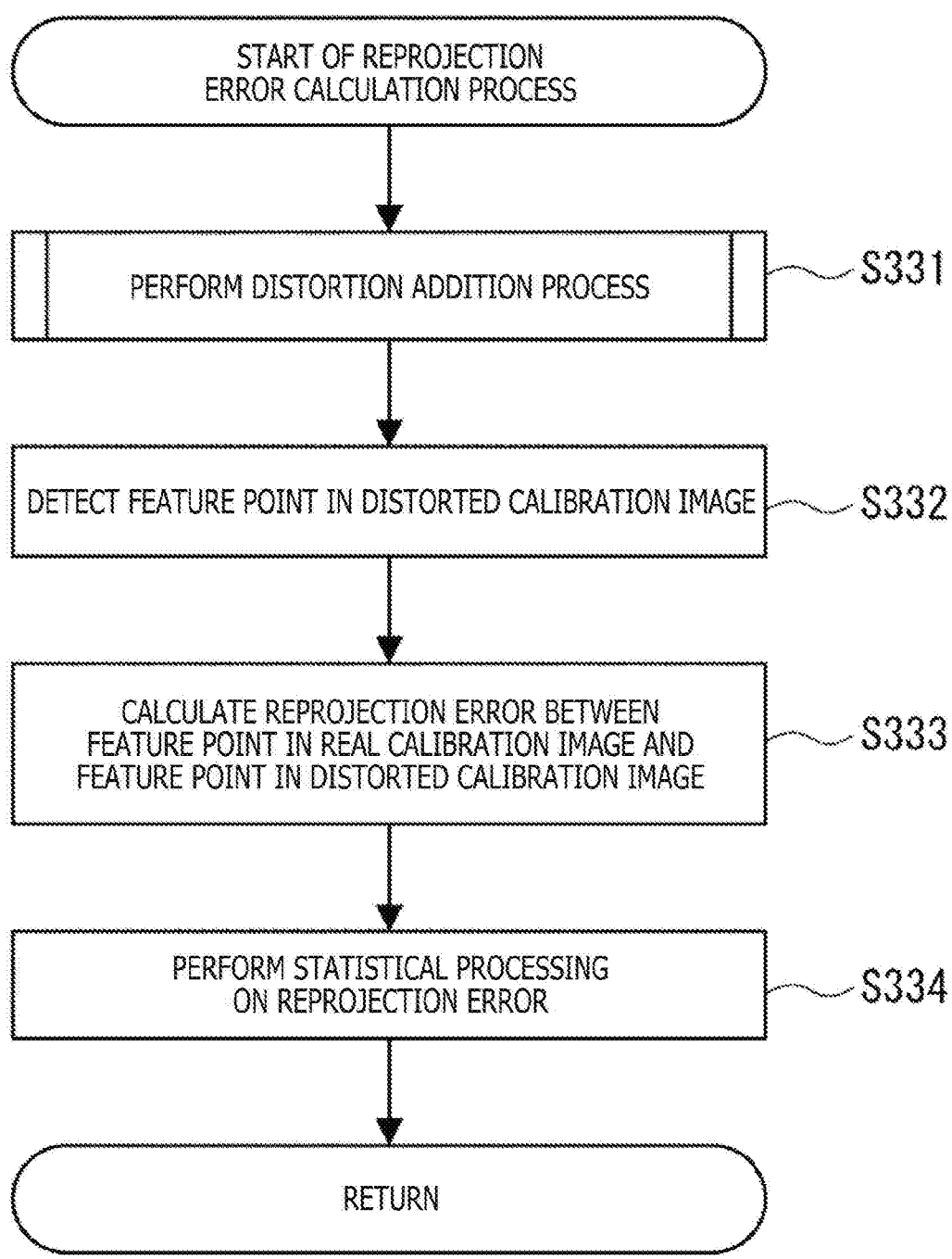
FIG. 18 is a diagram illustrating the details of a reprojection error calculation process.
Figure 19:
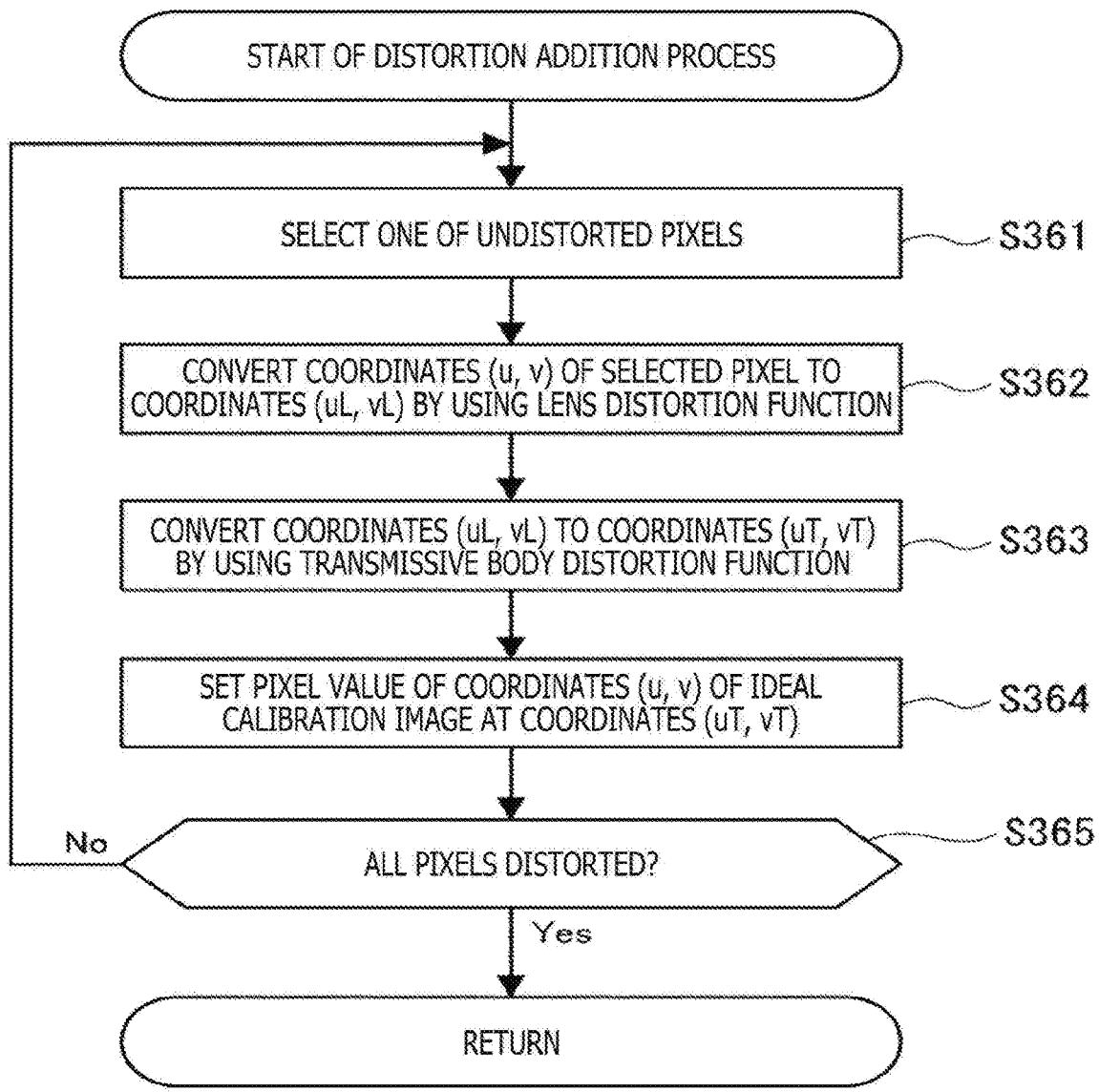
FIG. 19 is a diagram illustrating the details of a distortion addition process.

Processes performed by the image processing system 301 will now be described with reference to FIGS. 17 to 19.

<Distortion Estimation Process>

First of all, a distortion estimation process performed by the image processing system 301 will be described with reference to the flowchart of FIG. 17.

Figure 3:
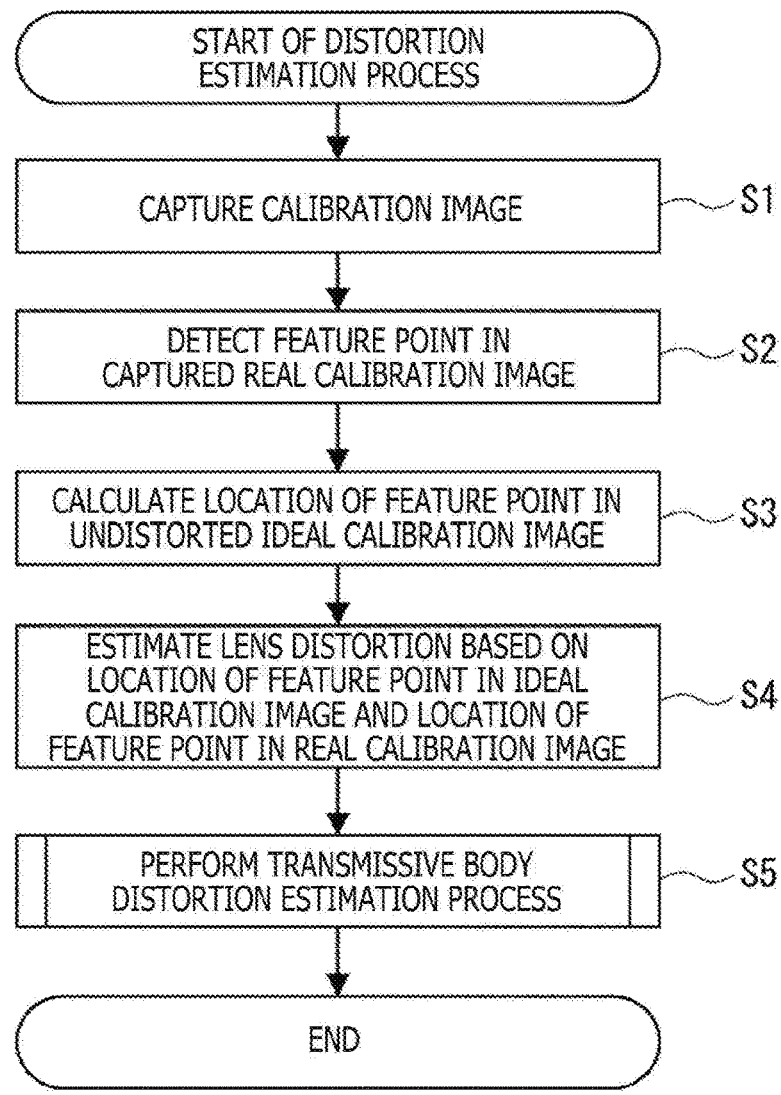
FIG. 3 is a flowchart illustrating a distortion estimation process that is performed by the image processing system depicted in FIG. 1.

In step S301, a calibration image is captured in a manner similar to step S1 in FIG. 3.

In step S302, a feature point in a captured real calibration image is detected in a manner similar to step S2 in FIG. 3.

In step S303, the parameter estimation section 361 estimates a homography matrix.

In step S304, the parameter estimation section 361 estimates the internal and external parameters of the imaging section 21.

In step S305, the lens distortion estimation section 362 estimates lens distortion in accordance with the estimated internal and external parameters of the imaging section 21. The lens distortion estimation section 362 causes the storage section 52 to store a lens distortion function indicative of the estimated lens distortion.

It should be noted that the details of processing performed in steps S303 to S305 are disclosed in "Zhengyou Zhang, Flexible camera calibration by viewing a plane from unknown orientations, Computer Vision, 1999, The Proceedings of the Seventh IEEE International Conference on, IEEE, 1999, Vol. 1" (hereinafter referred to as Non-patent Literature 3). Here, processing performed in steps S303 to S305 estimates the internal parameter (internal matrix K) and external parameters (rotation component R and translation component t) of the imaging section 21, and the lens distortion coefficient of the lens distortion function.

In step S306, the location of a feature point in an undistorted ideal calibration image is calculated in a manner similar to step S3 in FIG. 3.

In step S307, a transmissive body distortion estimation process is performed in a manner similar to step S5 in FIG. 3.

In step S308, a distortion estimation section 351 performs a reprojection error calculation process.

Referring now to the flowchart of FIG. 18, the reprojection error calculation process will be described in detail.

In step S331, the reprojection error calculation section 363 performs a distortion addition process.

Referring now to the flowchart of FIG. 19, the distortion addition process will be described in detail.

In step S361, the reprojection error calculation section 363 selects one of undistorted pixels.

In step S362, the reprojection error calculation section 363 converts the coordinates (u, v) of the selected pixel to the coordinates (uL, vL) by using the lens distortion function.

In step S363, the reprojection error calculation section 363 converts the coordinates (uL, vL) to the coordinates (uT, vT) by using the transmissive body distortion functions.

In step S364, the reprojection error calculation section 363 sets the pixel value of the coordinates (uT, vT) of an ideal calibration image at the coordinates (u, v). The pixel value of the coordinates (u, v) of the ideal calibration image is then set for a pixel at the coordinates (uT, vT) of the ideal calibration image to which distortion is added (hereinafter referred to as the distorted calibration image).

In step S365, the reprojection error calculation section 363 determines whether or not distortion is added to all pixels. In a case where it is determined that distortion is not added to all pixels, processing returns to step S361.

Subsequently, steps S361 to S365 are repeatedly performed until it is determined in step S365 that distortion is added to all pixels.

Meanwhile, in a case where it is determined in step S365 that distortion is added to all pixels, the distortion addition process ends.

As described above, the distorted calibration image, which is obtained by adding lens distortion and transmissive body distortion to the ideal calibration image, is generated by using the lens and transmissive body distortion functions.

Returning to FIG. 18, in step S332, the feature point detection section 61 detects a feature point in a calibration image to which distortion is added (distorted calibration image). More specifically, the feature point detection section 61 detects a feature point in the distorted calibration image by performing processing in a manner similar to step S2 in FIG. 3.

In step S333, the reprojection error calculation section 363 calculates a reprojection error between the feature point in the real calibration image and the feature point in the calibration image to which distortion is added (distorted calibration image).

If, in the above instance, the results of estimation of lens and transmissive body distortion functions are not in error, the location of the feature point in the real calibration image coincides with the location of the feature point in the distorted calibration image. Meanwhile, if the results of estimation of lens and transmissive body distortion functions are in error, the location of the feature point in the real calibration image does not coincide with the location of the feature point in the distorted calibration image.

Consequently, the reprojection error calculation section 363 calculates an error (reprojection error) between the location of each feature point in the real calibration image and the location of each corresponding feature point in the distorted calibration image.

In step S334, the reprojection error calculation section 363 performs statistical processing on the reprojection error. For example, the reprojection error calculation section 363 calculates an average reprojection error, an RMSE (Root Mean Squared Error), or other statistic for determining whether the reprojection error has converged.

Subsequently, the reprojection error calculation process ends.

Returning to FIG. 17, in step S309, the reprojection error calculation section 363 determines whether or not the reprojection error has converged. In a case where it is determined that the reprojection error has not converged, processing returns to step S303.

Subsequently, steps S303 to S309 are repeatedly performed until it is determined in step S309 that the reprojection error has converged. The lens and transmissive body distortion functions are then updated to improve the accuracy of estimation of the lens and transmissive body distortion functions.

Meanwhile, in a case where, based, for example, on the variation of the statistic regarding the reprojection error, the reprojection error calculation section 363 determines in step S309 that the reprojection error has converged, the distortion estimation process ends.

It should be noted that, in a case, for example, where the reproduction error does not decrease to a predetermined threshold value or smaller, the reprojection error calculation section 363 may determine that the estimation process has failed.

As described above, even in a case where the internal and external parameters of the imaging section 21 are unknown, the lens and transmissive body distortion functions can be easily and accurately estimated.

It should be noted that the imaging process performed by the image processing system 301 is similar to the imaging process performed by the image processing system 201, and will not be redundantly described.

4. Example Applications

Example applications of the present technology will now be specifically described with reference to FIGS. 20 to 24.

Figure 20:
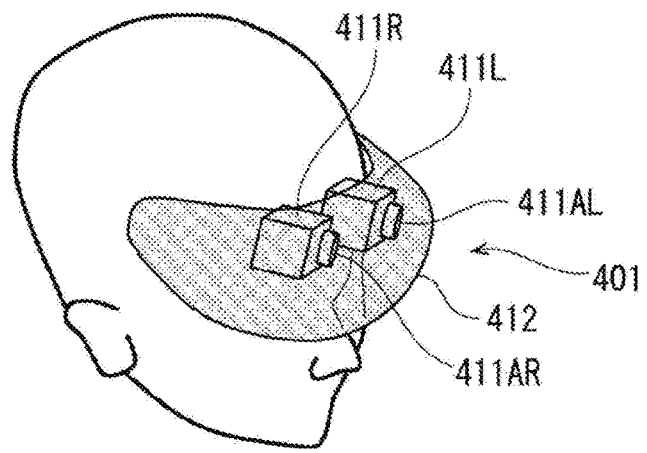
FIG. 20 is a schematic diagram illustrating an example configuration of a wearable device.

FIG. 20 illustrates an example in which the present technology is applied to a wearable device 401 for AR or VR.

The wearable device 401 includes a camera 411L having a lens 411AL, a camera 411R having a lens 411AR, and a visor 412. From the viewpoint of design and protection, the forward direction (direction toward the object) of the camera 411L and camera 411R is covered by the visor 412.

The wearable device 401 is capable of performing stereoscopic imaging by using the camera 411L and the camera 411R. Based on images captured by the camera 411L and the camera 411R, the wearable device 401 performs processes, for example, of recognizing surrounding objects and measuring the distance to them. Further, the wearable device 401 uses the results of such processes in order, for example, to recognize a gesture or display a virtual object on a transparent head-up display in a superimposed manner.

The camera 411L captures an image through the visor 412 and the lens 411AL. Therefore, the image captured by the camera 411L (hereinafter referred to as the left image) contains transmissive body distortion caused by the visor 412 and lens distortion caused by the lens 411AL.

The camera 411R captures an image through the visor 412 and the lens 411AR. Therefore, the image captured by the camera 411R (hereinafter referred to as the right image) contains transmissive body distortion caused by the visor 412 and lens distortion caused by the lens 411AR.

Consequently, in the wearable device 401, a process of estimating transmissive body distortion and lens distortion is performed individually on the camera 411L and the camera 411R.

More specifically, the transmissive body distortion function for the visor 412 and the lens distortion function for the lens 411AL are estimated with respect to the camera 411L. The transmissive body distortion and lens distortion in the left image are then corrected by using the estimated transmissive body distortion function and the estimated lens distortion function (or by using the distortion correction table for the camera 411L).

Further, the transmissive body distortion function for the visor 412 and the lens distortion function for the lens 411AR are estimated with respect to the camera 411R. The transmissive body distortion and lens distortion in the right image are then corrected by using the estimated transmissive body distortion function and the estimated lens distortion function (or by using the distortion correction table for the camera 411R).

Correcting the transmissive body distortion and lens distortion in the left and right images as described above improves the accuracy of processes, for example, of recognizing surrounding objects and measuring the distance to them.

Figure 21:
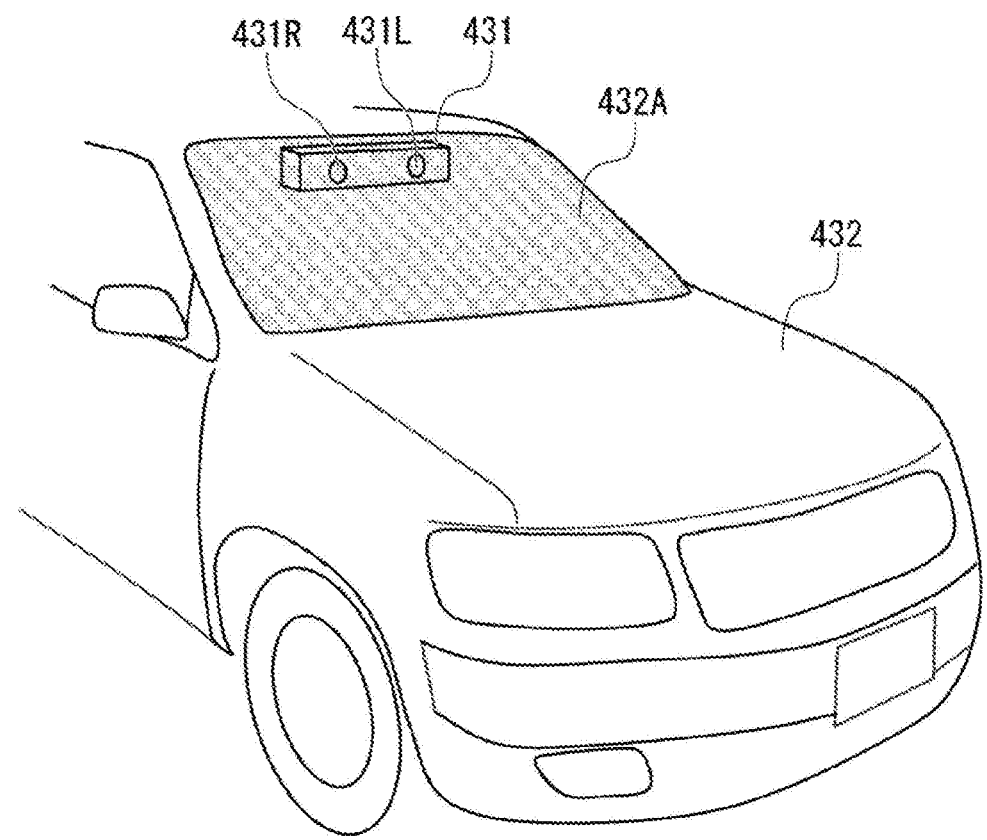
FIG. 21 is a schematic diagram illustrating an example configuration of a vehicle-mounted camera.

FIG. 21 illustrates an example in which the present technology is applied to a vehicle-mounted camera 431.

The vehicle-mounted camera 431 is configured such that a lens 431L and a lens 431R are respectively disposed on the left and right sides to perform stereoscopic imaging through the lens 431L and the lens 431R. Further, the vehicle-mounted camera 431 is disposed in a compartment of a vehicle 432 to capture an image of a forward view from the vehicle 432 through a windshield 432A that is a transmissive body.

For example, processes of recognizing objects around the vehicle 432 and measuring the distance to them are performed based, for instance, on an image captured by the vehicle-mounted camera 431. Further, for example, autonomous driving is performed by using the results of such processes. Furthermore, for example, an image captured by the vehicle-mounted camera 431 is recorded in an event data recorder.

A left image captured by the vehicle-mounted camera 431 (hereinafter referred to as the left image) contains transmissive body distortion caused by the windshield 432A and lens distortion caused by the lens 431L. A right image captured by the vehicle-mounted camera 431 (hereinafter referred to as the right image) contains transmissive body distortion caused by the windshield 432A and lens distortion caused by the lens 431R.

Consequently, the transmissive body distortion function for the windshield 432A and the lens distortion function for the lens 431L are estimated with respect to the left image. The transmissive body distortion and lens distortion in the left image are then corrected by using the estimated transmissive body distortion function and the estimated lens distortion function (or by using the distortion correction table for the left image).

Further, the transmissive body distortion function for the windshield 432A and the lens distortion function for the lens 431R are estimated with respect to the right image. The transmissive body distortion and lens distortion in the right image are then corrected by using the estimated transmissive body distortion function and the estimated lens distortion function (or by using the distortion correction table for the right image).

Correcting the transmissive body distortion and lens distortion in the left and right images as described above improves the accuracy of processes, for example, of recognizing objects around the vehicle 432 and measuring the distance to them.

Figure 22:
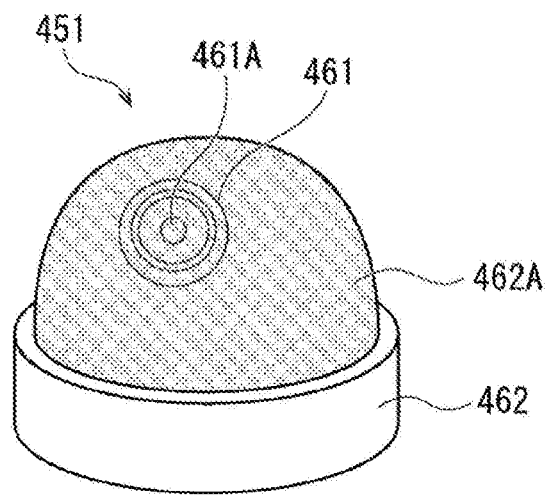
FIG. 22 is a schematic diagram illustrating an example configuration of a dome camera.

FIG. 22 illustrates an example in which the present technology is applied to a dome camera 451 used for surveillance and other purposes.

The dome camera 451 includes a camera 461 having a lens 461A and a housing 462 having a cover 462A. The camera 461 is installed in the housing 462, and covered all around with the cover 462A, which is a dome-shaped, translucent, transmissive body.

The camera 461 captures an image through the cover 462A and the lens 461A. Therefore, the image captured by the camera 461 contains transmissive body distortion caused by the cover 462A and lens distortion caused by the lens 461A.

Consequently, the transmissive body distortion function for the cover 462A and the lens distortion function for the lens 461A are estimated with respect to the camera 461. The transmissive body distortion and lens distortion in the image captured by the camera 461 are then corrected by using the estimated transmissive body distortion function and the estimated lens distortion function.

Figure 23:
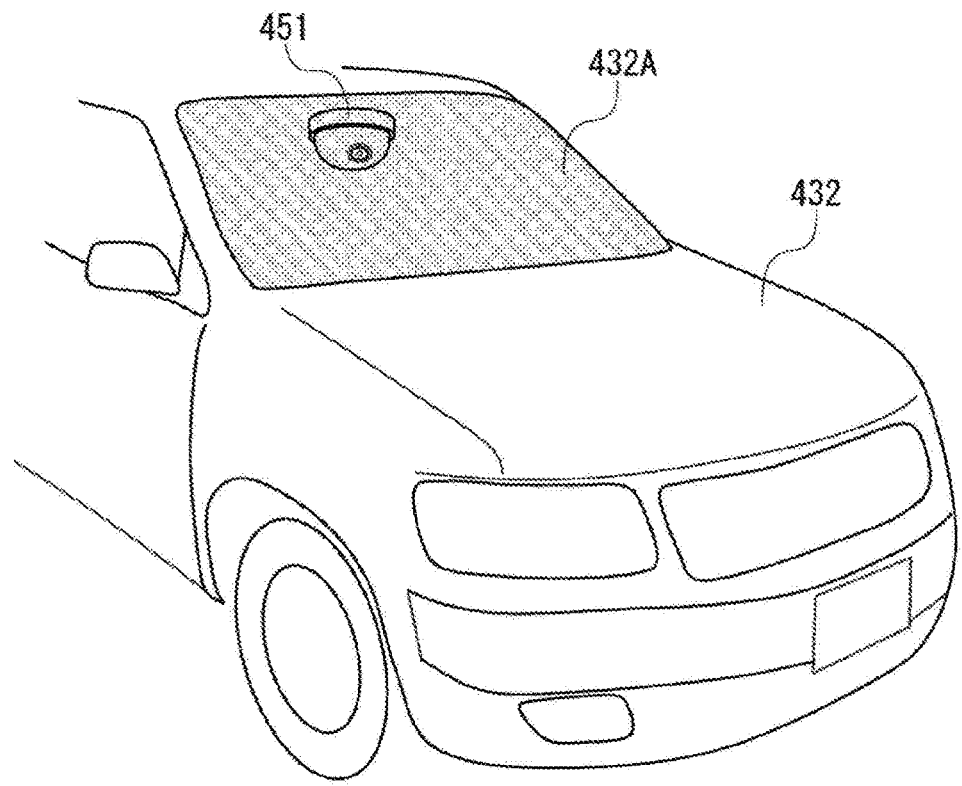
FIG. 23 is a schematic diagram illustrating an example of a case where a dome camera is installed in a vehicle.

FIG. 23 illustrates an example case where the dome camera 451 is installed in a compartment of the vehicle 432 instead of the vehicle-mounted camera 431 depicted in FIG. 21. In this case, the camera 461 captures images through the windshield 432A, the cover 462A, and the lens 461A. Therefore, the images are captured through two transmissive bodies, namely, the windshield 432A and the cover 462A.

In this case, too, the above-described distortion estimation process is performed so as to estimate transmissive body distortion by regarding the windshield 432A and the cover 462A as one transmissive body.

It should be noted that a method similar to the above-described one is used to estimate transmissive body distortion even in a case where images are captured through three or more transmissive bodies.

Figure 24:
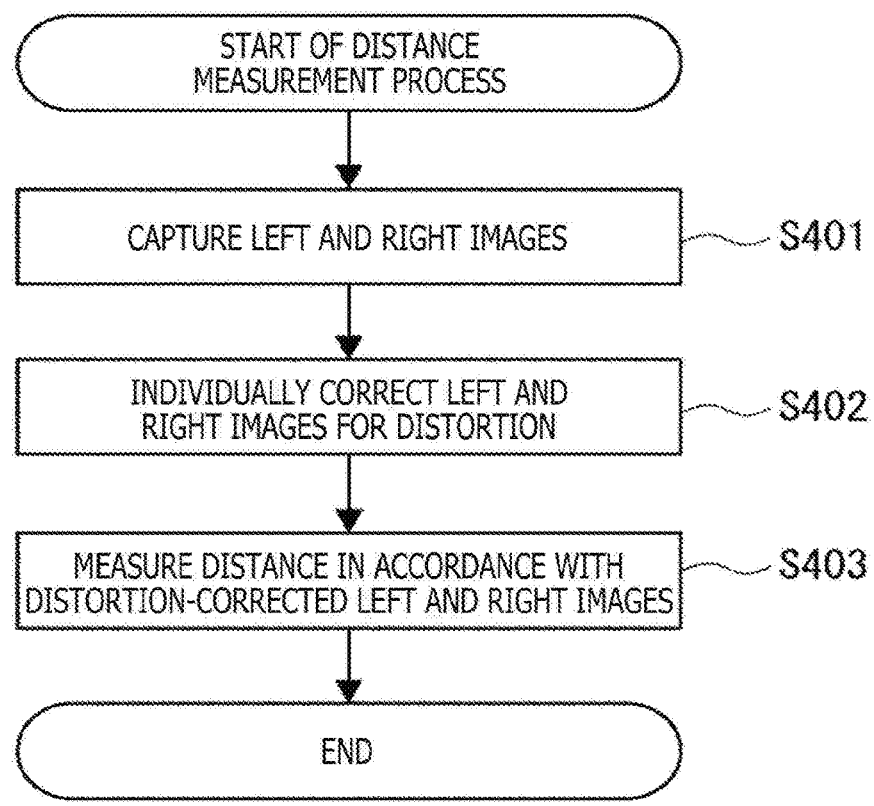
FIG. 24 is a flowchart illustrating a distance measurement process.

FIG. 24 is a flowchart illustrating a case where the distance measurement process is performed by using the vehicle-mounted camera 431 depicted in FIG. 20.

It should be noted that the following describes a case where the imaging section 21 of the image processing system 201 depicted in FIG. 11 includes the vehicle-mounted camera 431 and the image processing system 201 performs the distance measurement process.

In step S401, the vehicle-mounted camera 431 captures a left image and a right image. The vehicle-mounted camera 431 supplies the captured left and right images to the signal processing section 211.

In step S402, the distortion correction section 252 individually corrects distortion in the left and right images. For example, the distortion correction section 252 uses the distortion correction table for the left image to correct lens distortion and transmissive body distortion in the left image in accordance with the flowchart of FIG. 14. Similarly, the distortion correction section 252 uses the distortion correction table for the right image to correct lens distortion and transmissive body distortion in the right image in accordance with the flowchart of FIG. 14. The distortion correction section 252 supplies the corrected left and right images to the control section 23.

In step S403, the control section 23 makes a distance measurement based on the distortion-corrected left and right images. More specifically, the control section 23 uses an appropriate distance measurement method based on a stereo image in order to measure the distance to the object 13 in accordance with the left and right images. In this instance, the accuracy of distance measurement is improved because lens distortion and transmissive body distortion are removed from the left and right images. The control section 23 operates, for example, to store or display information indicative of measurement results or supply the information to an apparatus in a succeeding stage.

5. Example Modifications

Example modifications of the above-described embodiments of the present technology will now be described.

The various sections of the image processing system 1 depicted in FIG. 1 may be disposed in a single apparatus or separately disposed in a plurality of apparatuses. For example, the imaging section 21, the signal processing section 22, and the control section 23 may be disposed in a single apparatus or separately disposed in different apparatuses. Further, for example, two out of the above-mentioned three sections, namely, the imaging section 21, the signal processing section 22, and the control section 23, may be disposed in a single apparatus while the remaining one is disposed in a separate apparatus.

The above also holds true for the image processing system 201 depicted in FIG. 11 and the image processing system 301 depicted in FIG. 15.

Furthermore, the various sections included in the signal processing section depicted in FIG. 2 may be disposed in a single apparatus or separately disposed in a plurality of apparatuses. For example, the distortion estimation section 51 and the distortion correction section 53 may be separately disposed in different apparatuses. Moreover, for example, the distortion correction section 53 may be disposed in the imaging section 21 so as to let the imaging section 21 correct lens distortion and transmissive body distortion. In these cases, information indicative of the result of estimation by the distortion estimation section 51 is supplied to the distortion correction section 53, for example, through a network or a storage medium.

The above also holds true for the signal processing section 211 depicted in FIG. 12 and the signal processing section 311 depicted in FIG. 16.

6. Other

<Example Configuration of Computer>

The above-described series of processes can be performed by hardware or by software. In a case where the series of processes is to be performed by software, a program included in the software is installed on a computer. Here, the computer may be a computer incorporated in dedicated hardware or a general-purpose personal computer or other computer capable of performing various functions as far as various programs are installed on the computer.

Figure 25:
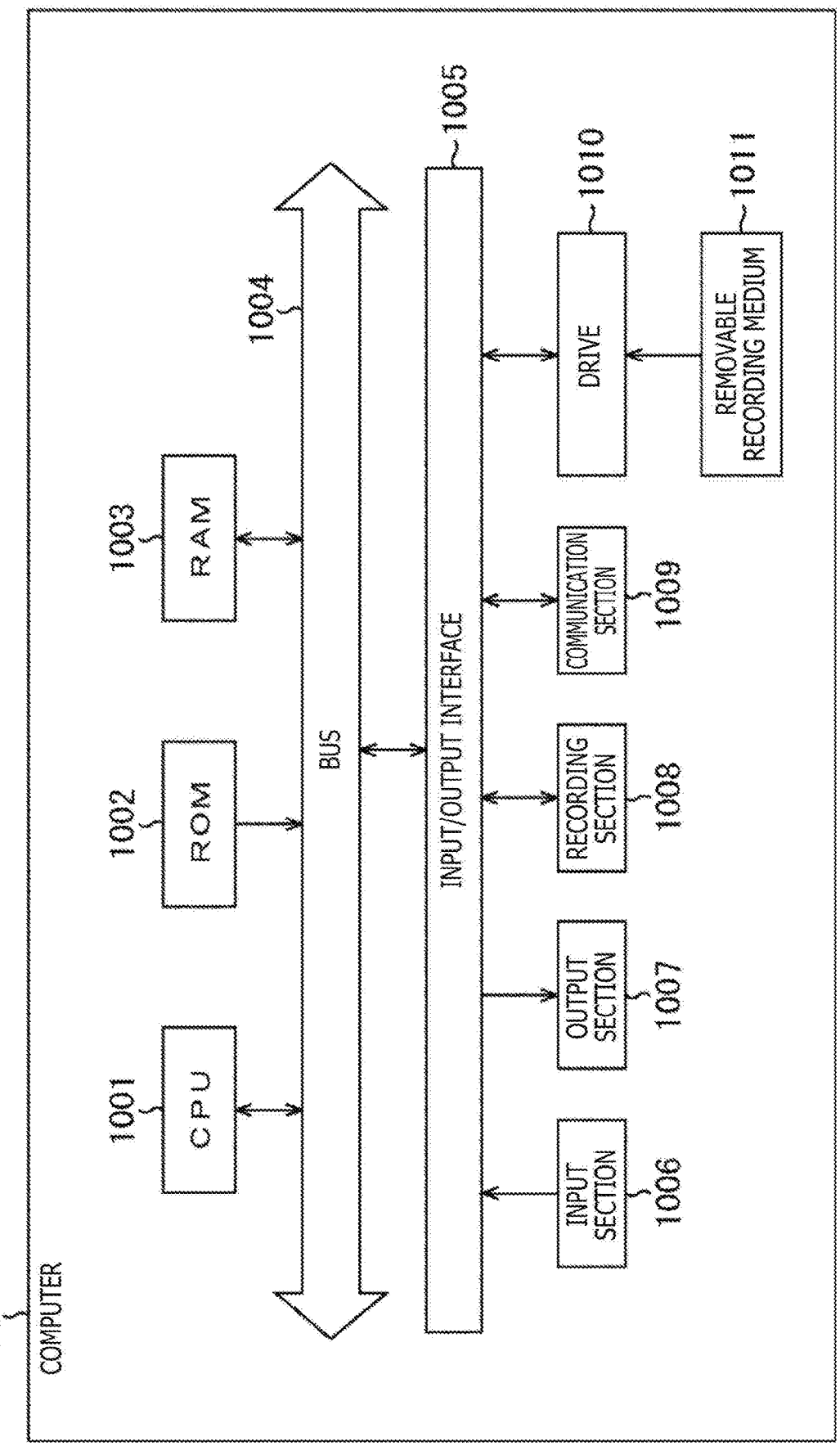
FIG. 25 is a diagram illustrating an example configuration of a computer.

FIG. 25 is a block diagram illustrating an example hardware configuration of a computer that performs the above-described series of processes by executing a program.

In a computer 1000, a CPU (Central Processing Unit) 1001, a ROM (Read Only Memory) 1002, and a RAM (Random Access Memory) 1003 are interconnected by a bus 1004.

The bus 1004 is further connected to an input/output interface 1005. The input/output interface 1005 is connected to an input section 1006, an output section 1007, a recording section 1008, a communication section 1009, and a drive 1010.

The input section 1006 includes, for example, an input switch, a button, a microphone, and an imaging element. The output section 1007 includes, for example, a display and a speaker. The recording section 1008 includes, for example, a hard disk and a nonvolatile memory. The communication section 1009 includes, for example, a network interface. The drive 1010 drives a removable recording medium 1011 such as a magnetic disk, an optical disk, a magneto-optical disk, or a semiconductor memory.

In the computer 1000 configured as described above, the CPU 1001 performs the above-described series of processes, for example, by loading a program recorded in the recording section 1008 into the RAM 1003 through the input/output interface 1005 and the bus 1004, and executing the loaded program.

The program to be executed by the computer 1000 (CPU 1001) may be recorded and supplied, for example, on the removable recording medium 1011, which is formed as a package medium. Further, the program may be supplied through a wired or wireless transmission medium such as a local area network, the Internet, or a digital satellite broadcasting system.

The computer 1000 is configured such that the program can be installed in the recording section 1008 through the input/output interface 1005 when the removable recording medium 1011 is inserted into the drive 1010. Further, the program can be received by the communication section 1009 through a wired or wireless transmission medium and installed in the recording section 1008. Moreover, the program can be preinstalled in the ROM 1002 or the recording section 1008.

It should be noted that the program to be executed by the computer may perform processing in a chronological order described in this document or perform processing in a parallel manner or at a required time point in response, for example, to a program call.

Further, the term "system" used in this document refers to an aggregate of a plurality of component elements (e.g., apparatuses and modules (parts)), and is applicable no matter whether or not all the component elements are within the same housing. Therefore, the term "system" may refer not only to a plurality of apparatuses accommodated in separate housings and connected through a network, but also to a single apparatus including a plurality of modules accommodated in a single housing.

Furthermore, the embodiments of the present technology are not limited to the above-described embodiments, and may be variously modified without departing from the spirit of the present technology.

For example, the present technology may be configured for cloud computing in which one function is shared by a plurality of apparatuses through a network in order to perform processing in a collaborative manner.

Moreover, each step described with reference to the foregoing flowcharts may be not only performed by one apparatus but also performed in a shared manner by a plurality of apparatuses.

Additionally, in a case where a plurality of processes is included in a single step, the plurality of processes included in such a single step may be not only performed by one apparatus but also performed in a shared manner by a plurality of apparatuses.

<Examples of Combined Configurations>

The present technology may adopt the following configurations.

(1)

A signal processing apparatus including:

a lens distortion estimation section that estimates lens distortion based on a location of a feature point in a first image of a predetermined object and a location of a feature point in a second image of the object, the first image being captured by an imaging section through a transmissive body and a lens that allow light to pass through, the second image being free of transmissive body distortion caused by the transmissive body and free of the lens distortion caused by the lens; and a transmissive body distortion estimation section that estimates the transmissive body distortion based on the location of the feature point in the first image and the location of a feature point in a third image, the third image being obtained by removing the estimated lens distortion from the first image.

(2)

The signal processing apparatus according to (1) above further including:

a distortion correction section that removes the estimated transmissive body distortion and the estimated lens distortion from a fourth image, the fourth image being captured by the imaging section through the transmissive body and the lens.

(3)

The signal processing apparatus according to (2) above further including:

a distortion correction table generation section that generates a distortion correction table indicating correspondence between a location of a pixel in a case where the transmissive body distortion and the lens distortion do not exist and a location of a pixel in a case where the transmissive body distortion and the lens distortion exist, in which the distortion correction section removes the estimated transmissive body distortion and the estimated lens distortion from the fourth image by using the distortion correction table.

(4)

The signal processing apparatus according to (2), in which the lens distortion estimation section estimates a lens distortion function indicative of the lens distortion, the transmissive body distortion estimation section estimates a transmissive body distortion function indicative of the transmissive body distortion, and the distortion correction section removes the estimated transmissive body distortion and the estimated lens distortion from the fourth image by using the transmissive body distortion function and the lens distortion function.

(5)

The signal processing apparatus according to any one of (1) to (4), in which the lens distortion estimation section estimates the lens distortion in accordance with a predetermined lens distortion model, and the transmissive body distortion estimation section estimates the transmissive body distortion in accordance with a predetermined transmissive body distortion model different from the predetermined lens distortion model.

(6)

The signal processing apparatus according to any one of (1) to (5) above further including:

a parameter estimation section that estimates internal and external parameters of the imaging section, in which the lens distortion estimation section estimates the lens distortion in accordance with the estimated internal and external parameters.

(7)

The signal processing apparatus according to (6) above further including:

a reprojection error calculation section that calculates a reprojection error, and determines based on the reprojection error whether a process of estimating the lens distortion and the transmissive body distortion has converged, the reprojection error indicating a difference between the location of the feature point in the first image and a location of a feature point in a fifth image, the fifth image being obtained by adding the estimated lens distortion and the estimated transmissive body distortion to the second image.

(8)

The signal processing apparatus according to any one of (1) to (7) above further including:

a feature point detection section that detects the feature point in the first image and the feature point in the third image; and a feature point calculation section that calculates the location of the feature point in the second image in accordance with the internal and external parameters of the imaging section, in which the lens distortion estimation section estimates the lens distortion based on the location of the detected feature point in the first image and the calculated location of the feature point in the second image, and the transmissive body distortion estimation section estimates the transmissive body distortion based on the location of the detected feature point in the first image and the location of the detected feature point in the third image.

(9)

The signal processing apparatus according to any one of (1) to (8) above further including:

a lens distortion correction section that generates the third image by removing the estimated lens distortion from the first image.

(10)

The signal processing apparatus according to any one of (1) to (9) above, in which the object has a predetermined pattern.

(11)

A signal processing method for a signal processing apparatus, the signal processing method including:

estimating lens distortion based on a location of a feature point in a first image of a predetermined object and a location of a feature point in a second image of the object, the first image being captured by an imaging section through a transmissive body and a lens that allow light to pass through, the second image being free of the transmissive body distortion caused by the transmissive body and free of the lens distortion caused by the lens; and estimating transmissive body distortion based on the location of the feature point in the first image and a location of a feature point in a third image, the third image being obtained by removing the estimated lens distortion from the first image.

(12)

A program for causing a computer to perform a process including:

estimating lens distortion based on a location of a feature point in a first image of a predetermined object and a location of a feature point in a second image of the object, the first image being captured by an imaging section through a transmissive body and a lens that allow light to pass through, the second image being free of the transmissive body distortion caused by the transmissive body and free of the lens distortion caused by the lens; and estimating transmissive body distortion based on the location of the feature point in the first image and a location of a feature point in a third image, the third image being obtained by removing the estimated lens distortion from the first image.

(13)

A signal processing apparatus including:

a distortion correction section that removes lens distortion estimated based on the location of a feature point in a first image of a predetermined object and the location of the feature point in a second image of the predetermined object, the first image being captured by an imaging section through a transmissive body and a lens that allow light to pass through, the second image being free of the transmissive body distortion caused by the transmissive body and free of the lens distortion caused by the lens, and transmissive body distortion estimated based on the location of the feature point in the first image and the location of the feature point in a third image from a fourth image, the third image being obtained by removing the estimated lens distortion from the first image, the fourth image being captured by the imaging section through the transmissive body and the lens.

(14)

A signal processing method for a signal processing apparatus, the signal processing method including:

removing lens distortion estimated based on the location of a feature point in a first image of a predetermined object and the location of the feature point in a second image of the predetermined object, the first image being captured by an imaging section through a transmissive body and a lens that allow light to pass through, the second image being free of the transmissive body distortion caused by the transmissive body and free of the lens distortion caused by the lens, and transmissive body distortion estimated based on the location of the feature point in the first image and the location of the feature point in a third image from a fourth image, the third image being obtained by removing the estimated lens distortion from the first image, the fourth image being captured by the imaging section through the transmissive body and the lens.

(15)

A program for causing a computer to perform a process including:

removing lens distortion estimated based on the location of a feature point in a first image of a predetermined object and the location of the feature point in a second image of the predetermined object, the first image being captured by an imaging section through a transmissive body and a lens that allow light to pass through, the second image being free of the transmissive body distortion caused by the transmissive body and free of the lens distortion caused by the lens, and transmissive body distortion estimated based on the location of the feature point in the first image and the location of the feature point in a third image from a fourth image, the third image being obtained by removing the estimated lens distortion from the first image, the fourth image being captured by the imaging section through the transmissive body and the lens.

(16)

An imaging apparatus including:

a lens;

an imaging section; and a distortion correction section that removes lens distortion estimated based on the location of a feature point in a first image of a predetermined object and the location of the feature point in a second image of the predetermined object, the first image being captured by the imaging section through a transmissive body and the lens that allow light to pass through, the second image being free of the transmissive body distortion caused by the transmissive body and free of the lens distortion caused by the lens, and transmissive body distortion estimated based on the location of the feature point in the first image and the location of the feature point in a third image from a fourth image, the third image being obtained by removing the estimated lens distortion from the first image, the fourth image being captured by the imaging section through the transmissive body and the lens.

(17)

The imaging apparatus according to (16) above further including:

a lens distortion estimation section that estimates the lens distortion based on the location of the feature point in the first image and the location of the feature point in the second image; and a transmissive body distortion estimation section that estimates the transmissive body distortion based on the location of the feature point in the first image and the location of the feature point in the third image.

It should be noted that the advantages described in this document are merely illustrative and not restrictive. The present technology can provide additional advantages.

REFERENCE SIGNS LIST

11 Image processing system, 12 Transmissive body, 13 Object, 21 Imaging section, 21A Lens, 22 Signal processing section, 23 Control section, 51 Distortion estimation section, 53 Distortion correction section, 61 Feature point detection section, 62 Feature point calculation section, 63 Lens distortion estimation section, 64 Lens distortion correction section, 65 Transmissive body distortion estimation section, 101-103 Calibration chart, 201 Image processing system, 211 Signal processing section, 251 Distortion correction table, 252 Distortion correction section, 301 Image processing system, 311 Signal processing section, 351 Distortion estimation section, 361 Parameter estimation section, 362 Lens distortion estimation section, 363 Reprojection error calculation section, 401 Wearable device, 411L, 411R Camera, 411AL, 411AR Lens, 412 Visor, 431 Vehicle-mounted camera, 431L, 431R Lens, 432 Vehicle, 432A Windshield, 451 Dome camera, 461 Camera, 461A Lens, 462 Housing, 462A Cover

The invention claimed is:

1. A signal processing apparatus, comprising:
a central processing unit (CPU) configured to:
estimate lens distortion in a first image of an object based on a location of a feature point in the first image and a location of a feature point in a second image of the object, wherein
the first image is captured by a camera through a transmissive body and a lens,
the lens distortion is caused by the lens,
the transmissive body and the lens allow light to pass through, and
the second image is free of:
transmissive body distortion caused by the transmissive body, and
the lens distortion caused by the lens;
remove the estimated lens distortion from the first image to obtain a third image; and
estimate the transmissive body distortion based on the location of the feature point in the first image and a location of a feature point in the third image.

2. The signal processing apparatus according to claim 1, wherein
the CPU is further configured to remove the estimated transmissive body distortion and the estimated lens distortion from a fourth image, and
the fourth image is captured by the camera through the transmissive body and the lens.

3. The signal processing apparatus according to claim 2, wherein the CPU is further configured to:
generate a distortion correction table indicating correspondence between:
a location of a pixel in the second image free of the transmissive body distortion and the lens distortion, and
a location of a pixel in the first image that includes the transmissive body distortion and the lens distortion; and
remove the estimated transmissive body distortion and the estimated lens distortion from the fourth image based on the distortion correction table.

4. The signal processing apparatus according to claim 2, wherein the CPU is further configured to:
estimate a lens distortion function indicative of the lens distortion;
estimate a transmissive body distortion function indicative of the transmissive body distortion; and
remove the estimated transmissive body distortion and the estimated lens distortion from the fourth image based on by using the transmissive body distortion function and the lens distortion function.

5. The signal processing apparatus according to claim 1, wherein
the CPU is further configured to:
estimate the lens distortion based on a lens distortion model; and
estimate the transmissive body distortion based on a transmissive body distortion model, and
the transmissive body distortion model is different from the lens distortion model.

6. The signal processing apparatus according to claim 1, wherein the CPU is further configured to:
estimate a plurality of internal parameters of the camera and a plurality of external parameters of the camera; and
estimate the lens distortion based on the estimated plurality of internal parameters and the estimated plurality of external parameters.

7. The signal processing apparatus according to claim 6, wherein the CPU is further configured to:
add the estimated lens distortion and the estimated transmissive body distortion to the second image to obtain a fifth image;
calculate a reprojection error that indicates a difference between the location of the feature point in the first image and a location of a feature point in the fifth image; and
determine, based on the reprojection error, whether a process of the estimation of the lens distortion and the estimation of the transmissive body distortion has converged.

8. The signal processing apparatus according to claim 1, wherein the CPU is further configured to:
detect the feature point in the first image and the feature point in the third image;
calculate the location of the feature point in the second image based on a plurality of internal parameters of the camera and a plurality of external parameters of the camera;
estimate the lens distortion based on the location of the detected feature point in the first image and the calculated location of the feature point in the second image; and
estimate the transmissive body distortion based on the location of the detected feature point in the first image and the location of the detected feature point in the third image.

9. The signal processing apparatus according to claim 1, wherein the CPU is further configured to remove the estimated lens distortion from the first image to generate the third image.

10. The signal processing apparatus according to claim 1, wherein the object has a pattern.

11. A signal processing method, comprising:
estimating lens distortion in a first image of an object based on a location of a feature point in the first image and a location of a feature point in a second image of the object, wherein
the first image is captured by a camera through a transmissive body and a lens, the lens distortion is caused by the lens, the transmissive body and the lens allow light to pass through, and the second image is free of:

transmissive body distortion caused by the transmissive body, and the lens distortion caused by the lens;

removing the estimated lens distortion from the first image to obtain a third image; and estimating the transmissive body distortion based on the location of the feature point in the first image and a location of a feature point in the third image.

12. A non-transitory computer-readable medium having stored thereon computer-executable instructions which, when executed by a processor, cause the processor to execute operations, the operations comprising:

estimating lens distortion in a first image of an object based on a location of a feature point in the first image and a location of a feature point in a second image of the object, wherein the first image is captured by a camera through a transmissive body and a lens, the lens distortion is caused by the lens, the transmissive body and the lens allow light to pass through, and the second image is free of:

transmissive body distortion caused by the transmissive body, and the lens distortion caused by the lens;

removing the estimated lens distortion from the first image to obtain a third image; and estimating the transmissive body distortion based on the location of the feature point in the first image and a location of a feature point in the third image.

* * * * *